United States Patent
Ohno

(10) Patent No.: US 11,173,872 B2
(45) Date of Patent: Nov. 16, 2021

(54) VEHICLE OCCUPANT RESTRAINT DEVICE

(71) Applicant: TOYOTA JIDOSHA KABUSHIKI KAISHA, Toyota (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 129 days.

(21) Appl. No.: 16/552,231

(22) Filed: Aug. 27, 2019

(65) Prior Publication Data
US 2020/0094776 A1  Mar. 26, 2020

(30) Foreign Application Priority Data

Sep. 25, 2018  (JP) .............................. JP2018-179481

(51) Int. Cl.
| | | |
|---|---|---|
| *B60R 22/26* | (2006.01) | |
| *B60R 22/18* | (2006.01) | |
| *B60R 22/48* | (2006.01) | |
| *B60R 22/34* | (2006.01) | |
| *B60R 22/20* | (2006.01) | |
| *B60N 2/22* | (2006.01) | |

(52) U.S. Cl.
CPC .............. *B60R 22/48* (2013.01); *B60R 22/26* (2013.01); *B60R 22/34* (2013.01); *B60N 2/22* (2013.01); *B60R 2022/1818* (2013.01); *B60R 2022/207* (2013.01); *B60R 2022/208* (2013.01); *B60R 2022/485* (2013.01)

(58) Field of Classification Search
CPC ............ B60R 2022/028; B60R 22/024; B60R 2022/1818; B60R 22/20; B60R 2022/207; B60R 2022/208; B60R 22/26
See application file for complete search history.

(56) References Cited

U.S. PATENT DOCUMENTS

| | | |
|---|---|---|
| 3,471,197 A | 10/1969 | Ely |
| 4,629,214 A | 12/1986 | Fohl |
| (Continued) | | |

FOREIGN PATENT DOCUMENTS

| | | |
|---|---|---|
| CN | 1130579 A | 9/1996 |
| CN | 106064603 A | 11/2016 |
| (Continued) | | |

OTHER PUBLICATIONS

Jun. 1, 2020 Office Action Issued in U.S. Appl. No. 16/238,156.
(Continued)

*Primary Examiner* — James A English
(74) *Attorney, Agent, or Firm* — Oliff PLC

(57) ABSTRACT

A vehicle occupant restraint device includes a three point seatbelt device that includes shoulder webbing running from one seat width direction end side of an upper section a seatback toward a buckle at another seat width direction end side of a lower section of the seatback, a shoulder webbing anchor that is provided on the one seat width direction end side of the upper section of the seatback, and through which the shoulder webbing is inserted, and a mover device that moves the shoulder webbing anchor toward a seat width direction outer side of the seatback when the seatback, which is configured so as to be capable of reclining from an upright state, has been reclined by at least a predetermined angle or greater with respect to a vertical direction.

4 Claims, 16 Drawing Sheets

(56) References Cited

U.S. PATENT DOCUMENTS

| | | | |
|---|---|---|---|
| 4,738,485 A | 4/1988 | Rumpf | |
| 5,306,073 A | 4/1994 | Rees | |
| 5,330,228 A | 7/1994 | Krebs et al. | |
| 5,358,310 A * | 10/1994 | Nemoto | B60R 22/023 297/473 |
| 5,390,982 A * | 2/1995 | Johnson | B60N 2/888 297/410 |
| 5,441,332 A * | 8/1995 | Verellen | B60R 22/20 297/473 |
| 5,544,917 A | 8/1996 | Loxton et al. | |
| 5,611,604 A | 3/1997 | Thomas et al. | |
| 5,628,529 A | 5/1997 | Golz et al. | |
| 5,660,444 A | 8/1997 | Thomas | |
| 5,810,417 A | 9/1998 | Jesadanont | |
| 5,845,967 A | 12/1998 | Kane et al. | |
| 5,882,084 A * | 3/1999 | Verellen | B60R 22/40 297/478 |
| 5,941,604 A | 8/1999 | Futschik et al. | |
| 6,068,340 A | 5/2000 | Yano et al. | |
| 6,145,881 A * | 11/2000 | Miller, III | B60R 22/1951 280/801.2 |
| 6,254,191 B1 * | 7/2001 | Yamamoto | B60R 22/405 242/384.4 |
| 6,340,209 B1 * | 1/2002 | Yamamoto | B60R 22/26 297/478 |
| 6,669,302 B2 | 12/2003 | Warner, Jr. et al. | |
| 6,802,537 B1 | 10/2004 | Tolfsen et al. | |
| 6,811,186 B1 * | 11/2004 | Fraley | B60R 22/26 280/801.2 |
| 7,090,251 B2 | 8/2006 | Tame | |
| 7,637,536 B2 | 12/2009 | Delventhal et al. | |
| 7,735,934 B2 | 6/2010 | Fuhrken et al. | |
| 7,740,096 B2 | 6/2010 | Bothe et al. | |
| 7,866,696 B2 | 1/2011 | Wang et al. | |
| 7,980,635 B2 * | 7/2011 | Matsushita | B60N 2/688 297/483 |
| 8,479,863 B2 * | 7/2013 | Adolfsson | B60R 22/02 180/268 |
| 8,820,789 B2 | 9/2014 | Merrill et al. | |
| 9,079,563 B2 * | 7/2015 | Ito | B60R 22/40 |
| 9,090,228 B2 | 7/2015 | Ono et al. | |
| 9,174,607 B2 | 11/2015 | Hata et al. | |
| 9,302,645 B1 * | 4/2016 | Shenaq | B60R 22/26 |
| 9,434,349 B1 | 9/2016 | Perkins et al. | |
| 9,669,796 B2 | 6/2017 | Ohno et al. | |
| 10,144,387 B1 * | 12/2018 | Jaradi | B60R 22/1955 |
| 10,196,033 B2 * | 2/2019 | Loew | B60R 22/26 |
| 10,246,051 B2 * | 4/2019 | Tegen | B60R 22/4628 |
| 10,501,038 B2 * | 12/2019 | Jaradi | B60N 2/4235 |
| 2006/0220426 A1 | 10/2006 | Moffatt et al. | |
| 2008/0054703 A1 | 3/2008 | Okazaki | |
| 2008/0246318 A1 | 10/2008 | Bothe et al. | |
| 2013/0200195 A1 | 8/2013 | Ono et al. | |
| 2019/0135226 A1 * | 5/2019 | Maekawa | B60R 22/48 |
| 2019/0241152 A1 * | 8/2019 | Ohno | B60R 22/20 |
| 2019/0299896 A1 | 10/2019 | Nagasawa | |

FOREIGN PATENT DOCUMENTS

| | | | | |
|---|---|---|---|---|
| JP | S52-143127 U | | 10/1977 | |
| JP | 01229744 A | * | 9/1989 | B60R 22/02 |
| JP | H05-112204 A | | 5/1993 | |
| JP | H05-301560 A | | 11/1993 | |
| JP | H06-72285 A | | 3/1994 | |
| JP | H11-139250 A | | 5/1999 | |
| JP | 2001-243476 A | | 9/2001 | |
| JP | 2007-253734 A | | 10/2007 | |
| JP | 2008-056229 A | | 3/2008 | |
| JP | 2009-234314 A | | 10/2009 | |
| JP | 2010-179726 A | | 8/2010 | |
| JP | 2015-127199 A | | 7/2015 | |
| JP | 2017-132366 A | | 8/2017 | |
| WO | 2018/167945 A1 | | 9/2018 | |

OTHER PUBLICATIONS

Dec. 11, 2020 Office Action issued in U.S. Appl. No. 16/238,156.
Mar. 25, 2021 Notice of Allowance issued in U.S. Appl. No. 16/238,156.

* cited by examiner

VEHICLE OCCUPANT RESTRAINT DEVICE

CROSS-REFERENCE TO RELATED APPLICATION

This application is based on and claims priority under 35 USC 119 from Japanese Patent Application No. 2018-179481 filed on Sep. 25, 2018, the disclosure of which is incorporated by reference herein.

BACKGROUND

Technical Field

The present disclosure relates to a vehicle occupant restraint device.

Related Art

Japanese Patent Application Laid-Open (JP-A) No. H11-139250 discloses a vehicle seat (a belt-in seat) in which a seatbelt retractor is attached to a seatback, such that webbing can be pulled out from a shoulder area (an upper section) of the seatback. This vehicle seat is configured as a reclining seat in which a tilt angle (reclining angle) of the seatback with respect to a seat cushion is adjustable.

As described in JP-A No. H11-139250, in reclining vehicle seats, a center of rotation of the upper body of an occupant seated in the vehicle seat and the center of rotation of the seatback are offset from each other. Thus, in a seatbelt device in which a shoulder webbing anchor is attached to a shoulder area of the seatback of the vehicle seat, when the seatback is heavily reclined, the shoulder webbing anchor moves toward the upper side of the seatback relative to the occupant seated in the vehicle seat.

Thus, the shoulder webbing that runs obliquely from the shoulder webbing anchor toward a lower section of the seatback might rub against the neck of the occupant and thereby cause discomfort.

SUMMARY

In consideration of the above circumstances, the present disclosure is to obtain a vehicle occupant restraint device capable of suppressing contact between shoulder webbing and the neck of an occupant, and improving the comfort of the occupant.

A vehicle occupant restraint device according to a first aspect of the present disclosure includes a three point seatbelt device that includes shoulder webbing running from one end side, in a seat width direction, of an upper section of a seatback toward a buckle at another end side, in the seat width direction, of a lower section of the seatback, a shoulder webbing anchor that is provided at the one end side of the upper section of the seatback, and through which the shoulder webbing is inserted, and a mover device that moves the shoulder webbing anchor toward a seat width direction outer side of the seatback when the seatback, which is configured to recline from an upright state, is reclined by at least a predetermined angle or greater with respect to a vertical direction.

Note that "when the seatback has been reclined by at least a predetermined angle or greater with respect to a vertical direction" includes both cases in which the shoulder webbing anchor is moved toward the seat width direction outer side of the seatback coordinated with reclining of the seatback, and cases in which the shoulder webbing anchor is moved toward the seat width direction outer side of the seatback if the seatback has been reclined by the predetermined angle or greater with respect to the vertical direction.

In the vehicle occupant restraint device according to the first aspect of the present disclosure, the shoulder webbing of the three point seatbelt device extends from the one seat width direction end side of the upper section of the seatback toward the buckle at the other seat width direction end side of the lower section of the seatback. The shoulder webbing anchor is provided on the one seat width direction end side of the upper section of the seatback, and the shoulder webbing is inserted through the shoulder webbing anchor. When the seatback has been reclined by at least the predetermined angle or greater with respect to the vertical direction, the shoulder webbing anchor is moved toward the seat width direction outer side of the seatback by the mover device. This enables the shoulder webbing to be moved in a direction away from the neck of the occupant in cases in which the seatback has been heavily reclined with respect to the vertical direction, thereby suppressing contact between the shoulder webbing and the neck of the occupant. The comfort of the occupant is thereby improved.

A vehicle occupant restraint device according to a second aspect of the present disclosure is the configuration of the first aspect, wherein the mover device includes a push-pull wire that couples together the shoulder webbing anchor and a portion of a seat cushion, and includes a biasing member that uses spring force to bias the shoulder webbing anchor toward a seat width direction inner side of the seatback.

In the vehicle occupant restraint device according to the second aspect of the present disclosure, the mover device includes the push-pull wire that couples the shoulder webbing anchor and a portion of the seat cushion together. For example, the shoulder webbing anchor is pulled by the push-pull wire coordinated with reclining of the seatback so as to move the shoulder webbing anchor toward the seat width direction outer side of the seatback. This enables the comfort of the occupant to be improved using a simple configuration.

The mover device further includes the biasing member that uses spring force to bias the shoulder webbing anchor toward the seat width direction inner side of the seatback. Accordingly, the shoulder webbing anchor is moved toward the seat width direction inner side of the seatback by the spring force when the seatback is returned from a position heavily reclined with respect to the vertical direction to a position in an upright state. This enables an appropriate distance to be maintained between the shoulder webbing and the neck of the occupant according to the recline angle of the seatback with respect to the vertical direction, enabling greater convenience and comfort for the occupant.

A vehicle occupant restraint device according to a third aspect of the present disclosure is the configuration of the first aspect, wherein the mover device includes an electrical adjustment device that moves the shoulder webbing anchor either in conjunction with reclining of the seatback, or after the seatback has reclined by the predetermined angle or greater with respect to the vertical direction.

In the vehicle occupant restraint device according to the third aspect of the present disclosure, the shoulder webbing anchor is moved toward the seat width direction outer side by the electrical adjustment device either coordinated with reclining of the seatback, or when the seatback has been reclined by the predetermined angle or greater with respect to the vertical direction. Using the electrical adjustment device in this manner enables the movement amount of the shoulder webbing anchor to be set as desired with respect to the recline angle of the seatback, in contrast for example to cases in which, for example, a mechanical configuration is used to move a shoulder belt anchor coordinated with reclining of a seatback. This further improves the comfort of the occupant.

A vehicle occupant restraint device according to a fourth aspect of the present disclosure is the configuration of the third aspect, wherein the electrical adjustment device moves the shoulder webbing anchor in conjunction with reclining of the seatback, and a movement amount of the shoulder webbing anchor toward the seat width direction outer side increases in conjunction with an increase in an angle at which the seatback is reclined with respect to the vertical direction.

In the vehicle occupant restraint device according to the fourth aspect of the present disclosure, the movement amount of the shoulder webbing anchor toward the seat width direction outer side increases accompanying an increase in the recline angle of the seatback with respect to the vertical direction. The position of the shoulder webbing anchor is thereby adjusted appropriately according to the recline angle of the seatback, thus further improving the comfort of the occupant.

A vehicle occupant restraint device according to a fifth aspect of the present disclosure is the configuration of the fourth aspect, wherein the electrical adjustment device includes a detection sensor configured to detect a physical amount for use in estimating a shoulder height position, of an occupant seated in a vehicle seat, with respect to the seatback, the shoulder height position of the occupant seated in the vehicle seat with respect to the seatback is estimated based on a detection value detected by the detection sensor, and the predetermined angle of the seatback with respect to the vertical direction at which the electrical adjustment device is to be actuated is changed in accordance with the estimated shoulder height position.

In the vehicle occupant restraint device according to the fifth aspect of the present disclosure, the shoulder height position with respect to the seatback of the occupant seated in the vehicle seat is estimated based on the detection value of the detection sensor, and the predetermined angle of the seatback with respect to the vertical direction at which the electrical adjustment device is to be actuated is changed according to the shoulder height position. Thus, the movement amount of the shoulder webbing anchor can be adjusted to suit the size of the physical build of the occupant as well as the recline angle of the seatback. The comfort of the occupant is thus further improved.

Due to having the configuration described above, the vehicle occupant restraint device of the first aspect of the present disclosure exhibits the excellent advantageous effect of suppressing contact between the shoulder webbing and the neck of the occupant, thus enabling the comfort of the occupant to be improved.

Due to having the configuration described above, the vehicle occupant restraint device of the second aspect of the present disclosure exhibits the excellent advantageous effects of enabling the shoulder webbing anchor to be moved with a simple configuration, enabling an appropriate distance to be maintained between the shoulder webbing and the neck of the occupant, and enabling the convenience and comfort for the occupant to be improved.

Due to having the configuration described above, the vehicle occupant restraint device of the third aspect of the present disclosure exhibits the excellent advantageous effect of enabling the movement amount of the shoulder webbing anchor to be set as desired according to the recline angle of the seatback, thus enabling the comfort of the occupant to be further improved.

Due to having the configuration described above, the vehicle occupant restraint device of the fourth aspect of the present disclosure exhibits the excellent advantageous effect of adjusting the position of the shoulder webbing anchor appropriately according to the recline angle of the seatback, thus enabling the comfort of the occupant to be further improved.

Due to having the configuration described above, the vehicle occupant restraint device of the fifth aspect of the present disclosure exhibits the excellent advantageous effect of enabling the movement amount of the shoulder webbing anchor to be adjusted to suit the size of the physical build of the occupant as well as the recline angle of the seatback, thus enabling the comfort of the occupant to be further improved.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
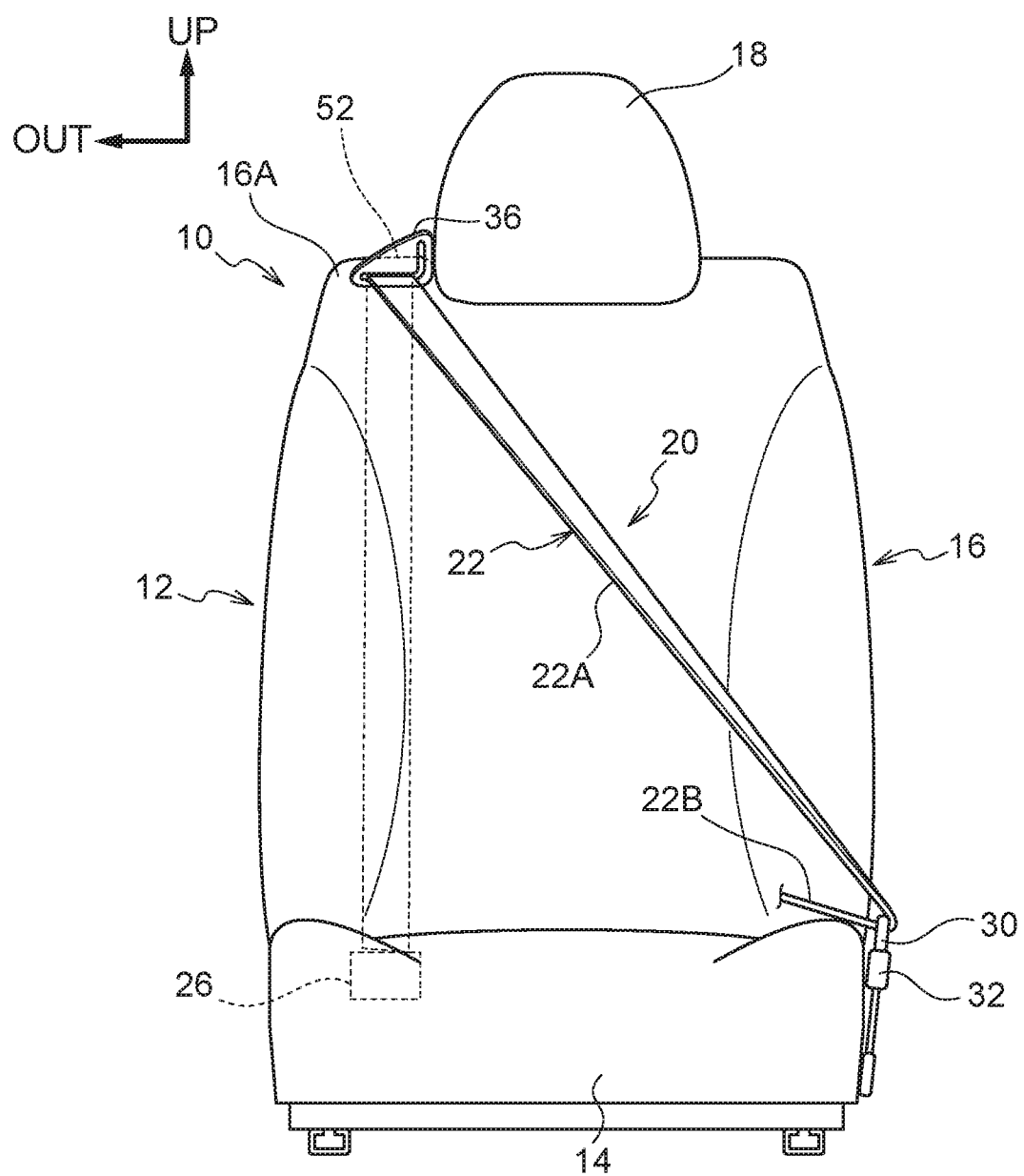
FIG. 1 is a schematic face-on view illustrating a vehicle seat provided with a vehicle occupant restraint device according to a first exemplary embodiment.

Explanation follows regarding a vehicle occupant restraint device 10 according to a first exemplary embodiment of the present disclosure, with reference to FIG. 1 to FIG. 10. The drawings are schematic in nature, and parts that are not relevant to the present disclosure are omitted from illustration. In each of the drawings, the arrow FR and the arrow UP respectively indicate a vehicle front-rear direction front side and a vehicle vertical direction upper side of a vehicle mounted with a vehicle seat 12 as appropriate. The arrow OUT indicates a vehicle width direction outer side. Note that in the present exemplary embodiment, a seat front-rear direction, a seat vertical direction, and a seat width direction of the vehicle seat 12 respectively correspond to the vehicle front-rear direction, the vehicle vertical direction, and the vehicle width direction. For ease of explanation, some reference numerals may be omitted from the drawings.

Configuration of Vehicle Occupant Restraint Device

Figure 2:
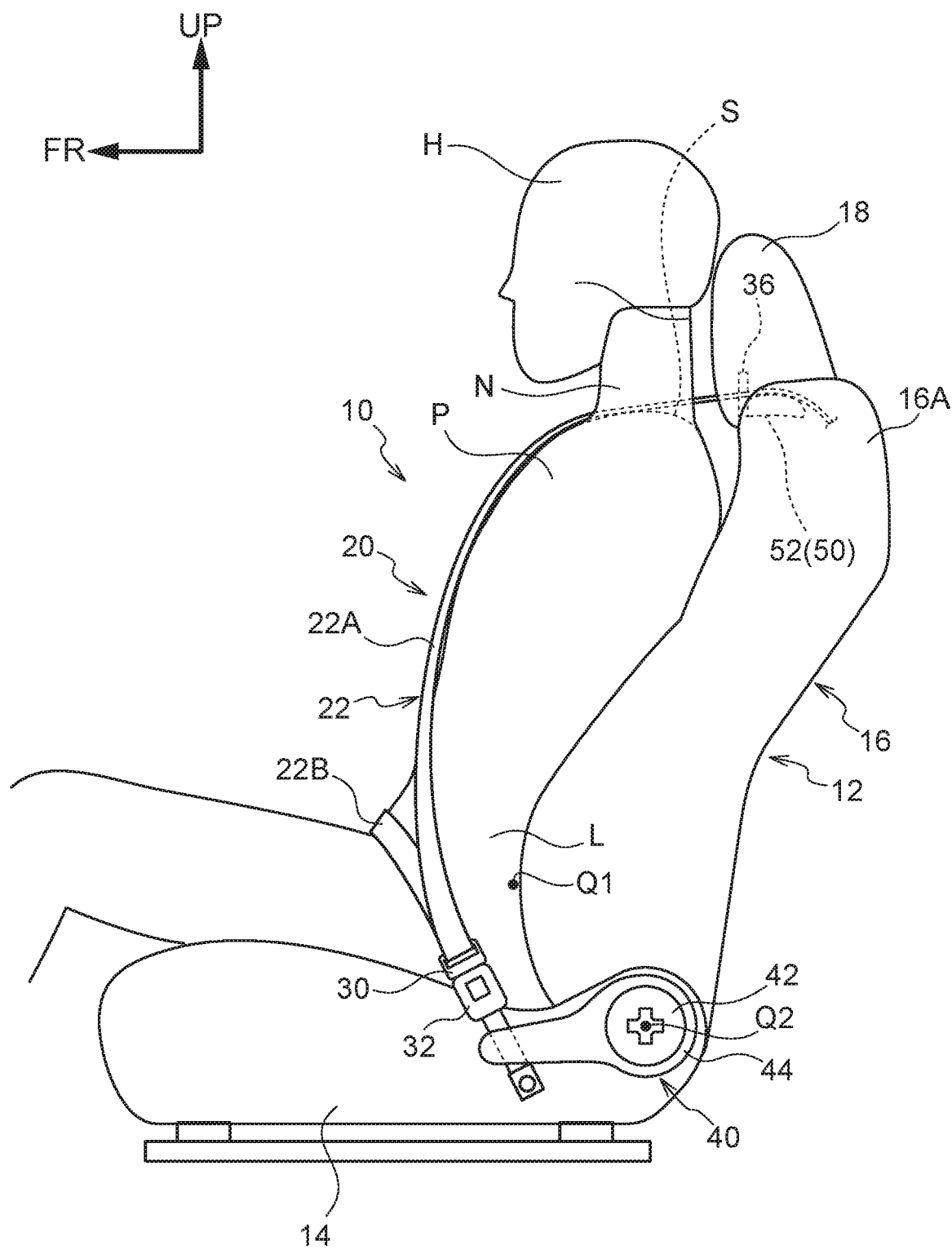
FIG. 2 is a side view of the vehicle occupant restraint device illustrated in FIG. 1, illustrating a state in which an occupant seated in the vehicle seat is being restrained while a seatback is upright.
Figure 3:
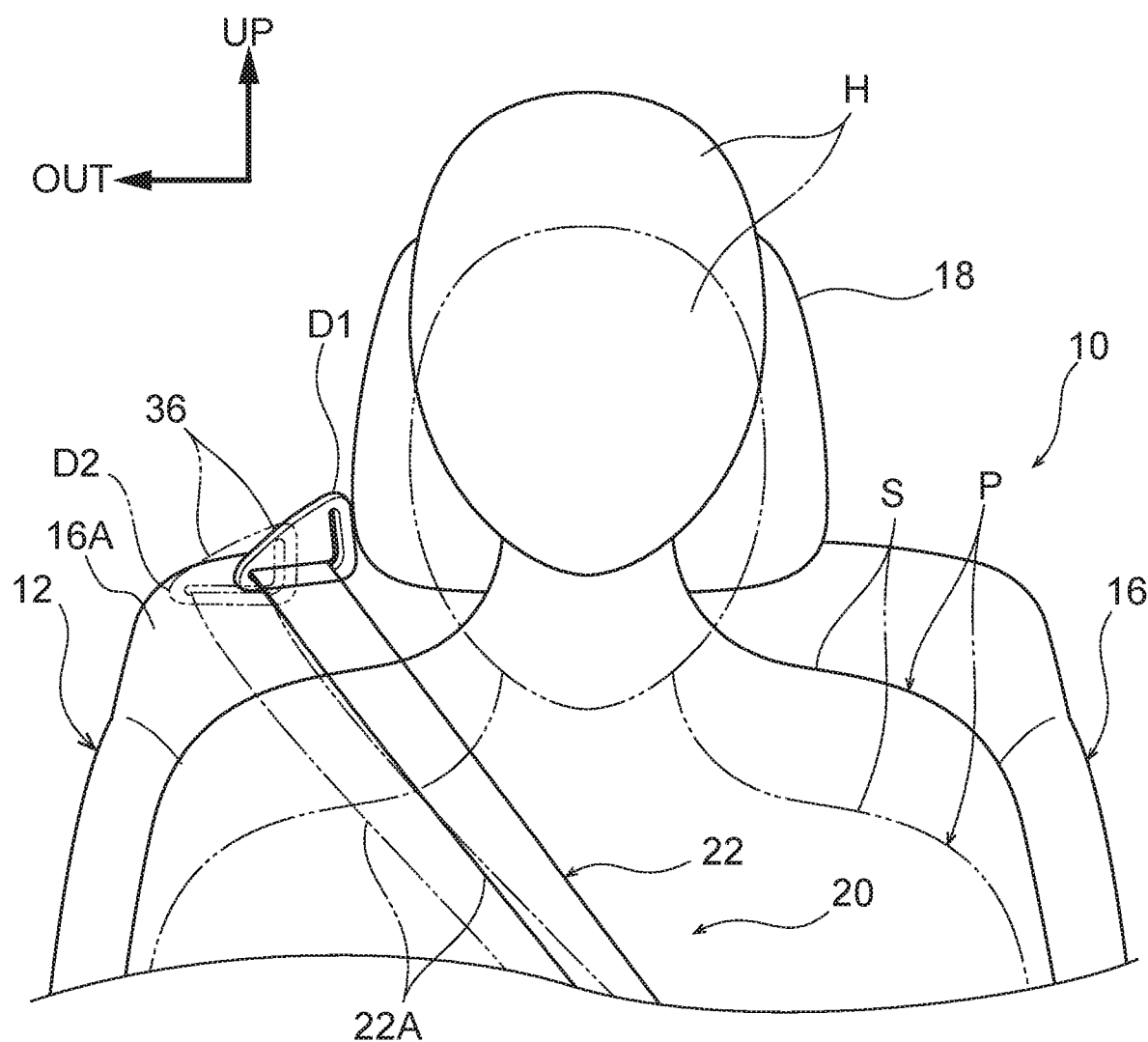
FIG. 3 is a partial face-on view of the vehicle occupant restraint device illustrated in FIG. 1, in which a state in which an occupant seated in the vehicle seat is restrained while a seatback is upright is illustrated by solid lines, and a state in which an occupant seated in the vehicle seat is restrained while the seatback is reclined is illustrated by double-dotted dashed lines.

As illustrated in FIG. 1 to FIG. 3, the vehicle occupant restraint device 10 according to the present exemplary embodiment is provided to the vehicle seat 12 (hereafter simply referred to as "seat 12"), this being a driving seat on the right side out of vehicle front seats inside a vehicle cabin.

The seat 12 includes a seat cushion 14 on which an occupant P sits, a seatback 16 that supports the back of the occupant P at a rear end portion of the seat cushion 14, and a headrest 18 that is disposed at an upper end portion of the seatback 16 and supports the head H of the occupant P. A shoulder webbing anchor 36 (hereafter referred to as "shoulder anchor 36"), through which webbing 22, described later, is inserted, is provided at the vehicle width direction outer side of an upper section 16A of the seatback 16 (shoulder area of the seatback 16).

To explain further, FIG. 2 and FIG. 3 illustrate a state in which an AM50 (American adult male in the 50$^{th}$ percentile) crash test dummy (doll) is seated on the seat cushion 14 of the seat 12 to simulate an occupant to be protected. This dummy is seated in a standard seated posture as set out in crash test methodology, and the seat 12 is positioned at a reference setting position corresponding to this seated posture. The dummy will be referred to hereafter as the "occupant P" as if it were a real occupant.

The vehicle occupant restraint device 10 includes a seatbelt device 20 serving as a three point seatbelt device provided directly to the seat 12. The seatbelt device 20 includes the webbing 22, and an anchor plate (not illustrated in the drawings) that is disposed at the vehicle width direction outer side of the seat cushion 14 and to which one end of the webbing 22 is anchored. The seatbelt device 20 also includes a retractor 26 with a pre-tensioner function, to which another end of the webbing 22 is anchored and that applies a predetermined tension to the webbing 22. The shoulder anchor 36 is configured at the vehicle width direction outer side of the upper section 16A of the seatback 16 so as to fold the webbing 22 back toward the side where the retractor 26 is installed. The seatbelt device 20 further includes a buckle device 32 which a tongue plate 30 through which the webbing 22 is inserted engages with and is thereby fixed to.

A section of the webbing 22 spanning from the shoulder anchor 36 to the buckle device 32 is referred to as shoulder webbing 22A, and a section of the webbing 22 spanning from the buckle device 32 to the anchor plate (not illustrated in the drawings) is referred to as lap webbing 22B.

The shoulder webbing 22A runs obliquely from a shoulder S at the vehicle width direction outer side of an upper region of the occupant P seated in the seat 12 to the lumbar region L at the vehicle width direction inner side of a lower region of the occupant P in order to restrain the occupant P from the front. Note that the vehicle width direction outer side of the seat 12 corresponds to one seat width direction end side, and the vehicle width direction inner side of the seat 12 corresponds to another seat width direction end side.

Figure 4:
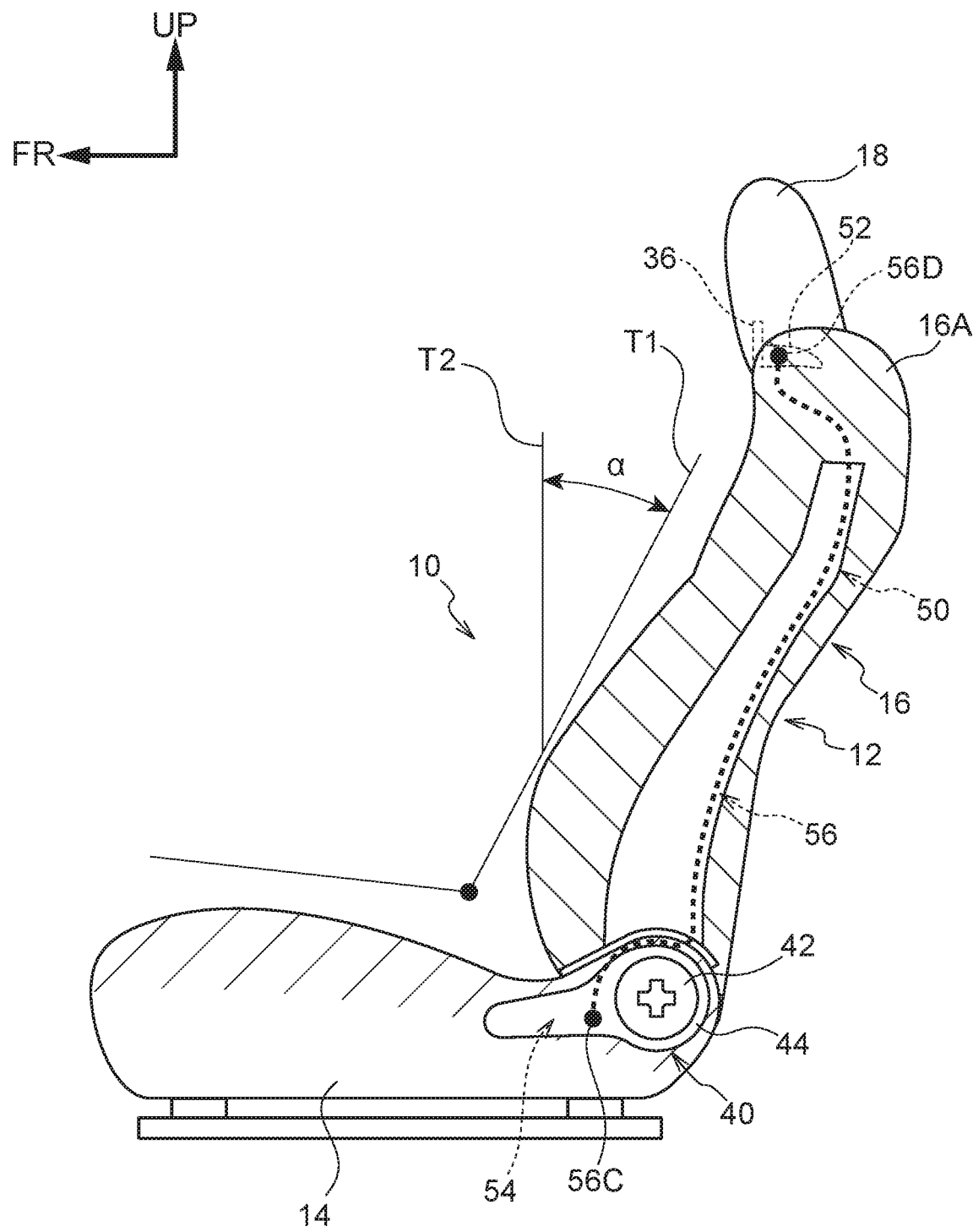
FIG. 4 is a schematic vertical cross-section illustrating a mover device employed in a vehicle occupant restraint device according to the first exemplary embodiment.
Figure 5:
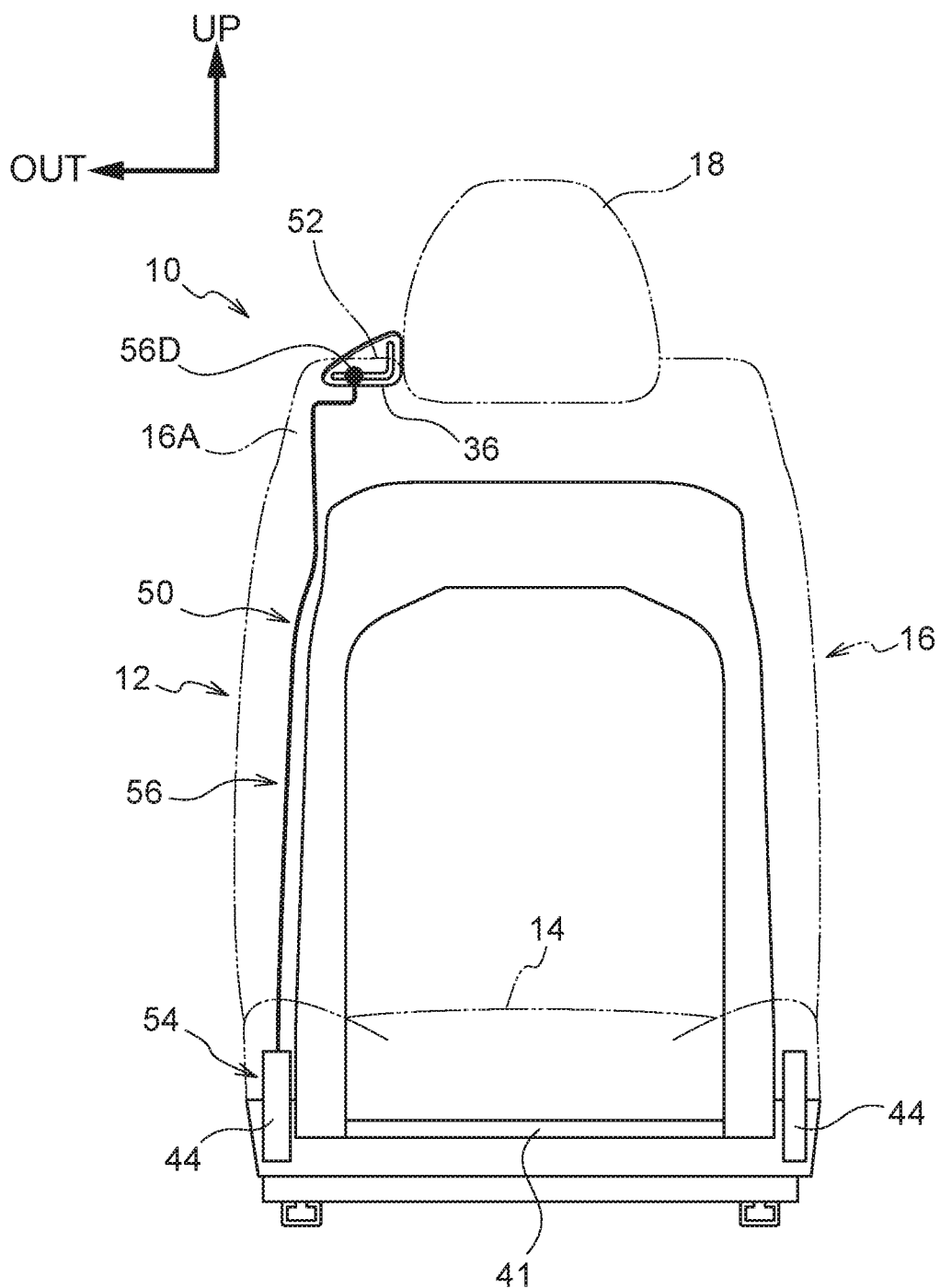
FIG. 5 is a schematic face-on view illustrating the mover device illustrated in FIG. 4.

As illustrated in FIG. 4 and FIG. 5, the seat 12 includes a reclining function to recline the seatback 16 (tilt the seatback 16 toward the vehicle rear side) from an upright state. More specifically, the seat 12 includes a reclining device 40 that changes a recline angle α (see FIG. 4) with respect to a vertical direction of the seatback 16. As an example, the reclining device 40 includes rotation sections 42 coupled to a rod 41 (see FIG. 5) disposed running along the vehicle width direction at a lower end portion of the seatback 16, guide sections 44 that rotatably support the respective rotation sections 42, and a drive section (not illustrated in the drawings) that rotates the rotation sections 42. The guide sections 44 are provided at side portions of the seat cushion 14. The drive section that rotates the rotation sections 42 is, for example, configured by a motor or the like. Note that the recline angle α refers to an angle α (see FIG. 4) formed between a torso line T1 of the occupant P and a straight line T2 running along the vertical direction in side view of the vehicle seat 12 in a state in which the occupant P is seated in the vehicle seat 12.

The vehicle occupant restraint device 10 includes a mover device 50 (see FIG. 1 and FIG. 2) that moves the shoulder anchor 36 along substantially the seat width direction of the seatback 16. As illustrated by solid lines in FIG. 3, in the upright state of the seatback 16, the shoulder anchor 36 is disposed at a normal position D1 at the seat width direction inner side of the seatback 16. As illustrated by double-dotted dashed lines in FIG. 3, when the seatback 16 has been reclined by a predetermined angle (such as 36°) or greater with respect to the vertical direction, the mover device 50 moves the shoulder anchor 36 to a moved position D2 at the seat width direction outer side of the seatback 16.

As illustrated in FIG. 4 and FIG. 5, the mover device 50 includes an upper movement section 52 that moves the shoulder anchor 36 at the upper section 16A of the seatback 16, and a lower movement section 54 provided at a vehicle front-rear direction rear section side of the seat cushion 14, serving as a portion of the seat cushion 14. The mover device 50 further includes a push-pull wire 56 that couples together the shoulder anchor 36 and a seat cushion frame 60 (see FIG.

Figure 7A:
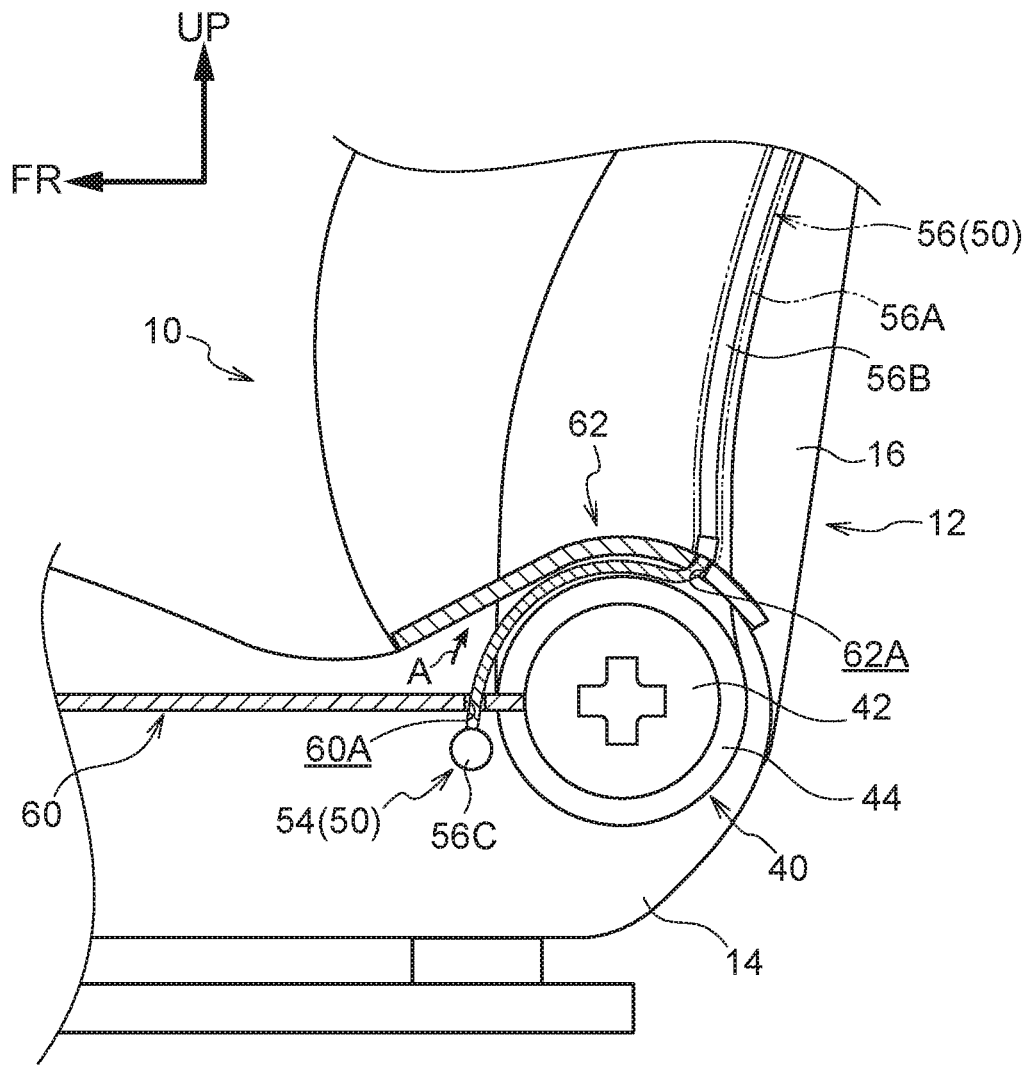
FIG. 7A is a cross-section illustrating a seat cushion-side attachment structure of a push-pull wire of the mover device illustrated in FIG. 4, in which a seatback is in an upright state.
Figure 7B:
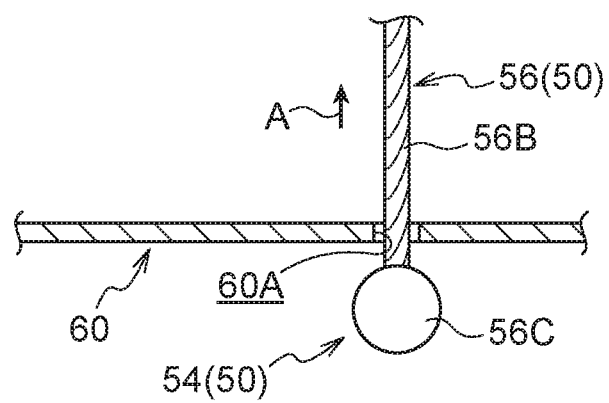
FIG. 7B is an enlarged cross-section illustrating a seat cushion frame and one length direction end portion of a push-pull wire.

7A and FIG. 7B) of the seat cushion 14 through the upper movement section 52. The upper movement section 52 is provided in the interior of the seatback 16, and the lower movement section 54 is provided in the interior of the seat cushion 14. The push-pull wire 56 is laid so as to straddle between the interior of the seat cushion 14 and the interior of the seatback 16. The push-pull wire 56 extends substantially along the vehicle vertical direction at the vehicle width direction outer side in the interior of the seatback 16 (see FIG. 5).

Figure 6:
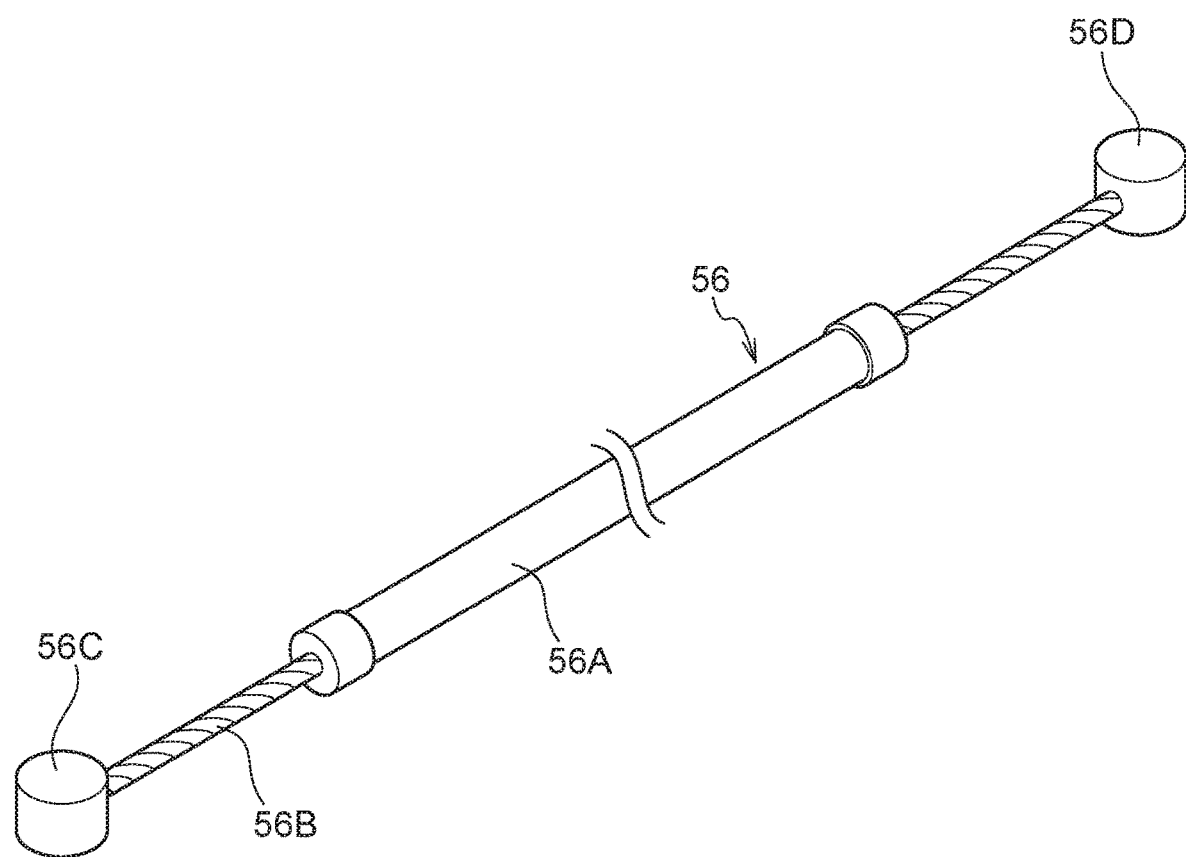
FIG. 6 is a perspective view illustrating a push-pull wire of the mover device illustrated in FIG. 4.

As illustrated in FIG. 6, the push-pull wire 56 includes an outer tube 56A extending along a length direction, and an inner wire 56B that is inserted through the outer tube 56A and is capable of moving along the length direction of the outer tube 56A. Circular column shaped terminal portions 56C, 56D, each with a larger external diameter than the external diameter of the inner wire 56B, are provided at the two length direction end portions of the inner wire 56B.

As illustrated in FIG. 7A and FIG. 7B, the seat cushion frame 60 is installed running substantially along the vehicle front-rear direction at the vehicle width direction outer sides in the interior of the seat cushion 14. The lower movement section 54 includes a circular through hole 60A formed at a rear end portion of the seat cushion frame 60, and the inner wire 56B of the push-pull wire 56 is inserted through the through hole 60A. The terminal portion 56C at the one length direction end side of the inner wire 56B is disposed at the vehicle vertical direction lower side of the through hole 60A, and an external diameter of the terminal portion 56C is larger than an internal diameter of the through hole 60A. Thus, when the inner wire 56B is pulled toward the vehicle upper side as illustrated by the arrow A, the terminal portion 56C of the inner wire 56B catches on an edge of the through hole 60A (see FIG. 8). Namely, the terminal portion 56C at the one length direction end side of the inner wire 56B functions as a stopper that restricts movement of the inner wire 56B toward the vehicle upper side.

As illustrated in FIG. 7A, the lower movement section 54 includes a guide plate 62 disposed at the vehicle vertical direction upper side of the corresponding guide section 44 with a spacing between the guide plate 62 and the guide section 44. As an example, the guide plate 62 is configured as an elongated plate body disposed with its plate thickness direction along the seat vertical direction and its length direction substantially along the seat front-rear direction. A location spanning from an intermediate portion to a rear end portion of the guide plate 62 curves in a circular arc shape in side view so as to follow the rotation direction of the rotation section 42. A seat width direction inside end portion of the guide plate 62 is anchored to a cutout portion (not illustrated in the drawings) formed in the lower end portion of the seatback 16, and is thereby fixed to the seatback 16.

The inner wire 56B is laid between the guide plate 62 and the guide section 44 so as to extend toward the upper side of the seat cushion frame 60. A through hole 62A is formed in a rear end portion of the guide plate 62. The inner wire 56B is inserted through the through hole 62A so as to be capable of moving along its length direction. One length direction end portion of the outer tube 56A of the push-pull wire 56 is fixed to an upper side edge of the through hole 62A of the guide plate 62.

Figure 8:
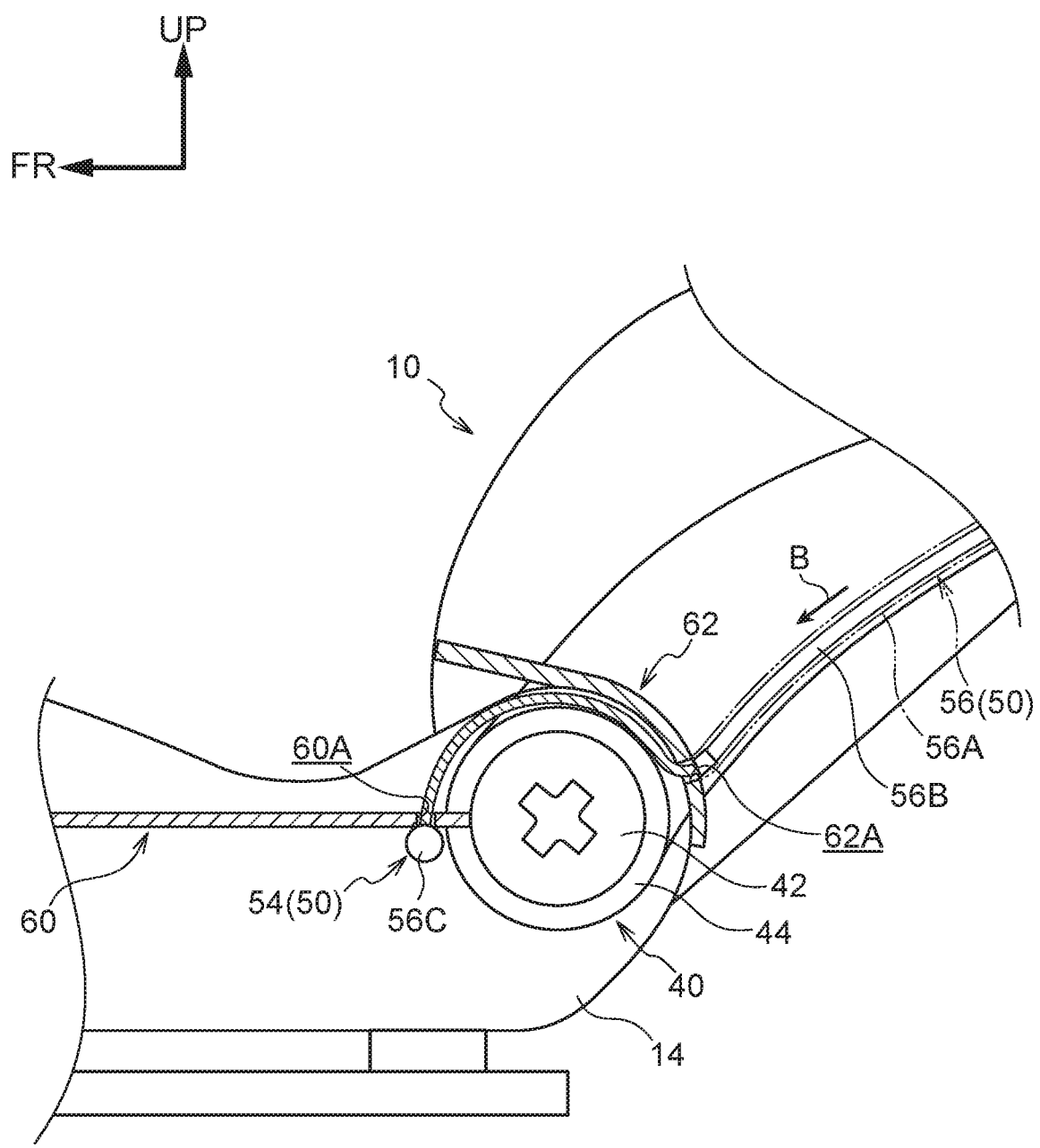
FIG. 8 is a cross-section illustrating a seat cushion-side attachment structure of a push-pull wire of the mover device illustrated in FIG. 4, in which a seatback is in a reclined state.

When the seatback 16 is reclined with respect to the vertical direction, the guide plate 62 moves toward the seat rear side along the guide section 44 (see FIG. 8). When this occurs, since the guide section 44 is fixed to the seat cushion 14, the guide plate 62 moves toward the seat rear side about the guide section 44. The length direction length of a portion of the inner wire 56B disposed between the guide plate 62 and the guide section 44 becomes longer, and the inner wire 56B is pulled toward the seat upper side as illustrated by the arrow A (see FIG. 7A), such that the terminal portion 56C of the inner wire 56B catches on the edge of the through hole 60A. Then, as illustrated in FIG. 8, if the seatback 16 is reclined further with respect to the vertical direction, the inner wire 56B is pulled toward the seat lower side with respect to the outer tube 56A, as illustrated by the arrow B. The inner wire 56B thereby moves the upper movement section 52 toward the seat width direction outer side.

Figure 9:
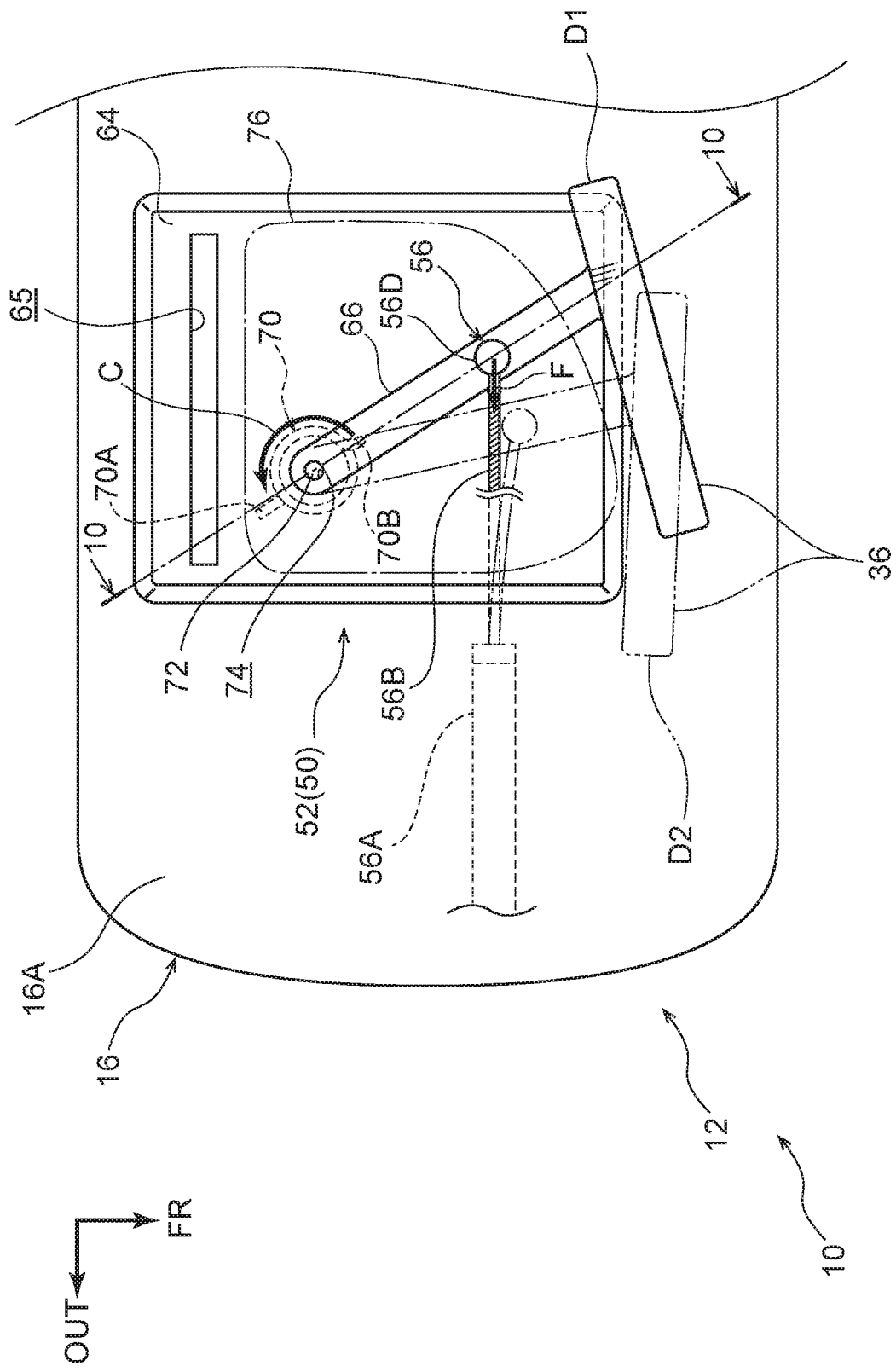
FIG. 9 is a partially enlarged plan view schematically illustrating a shoulder webbing anchor-side attachment structure of the mover device illustrated in FIG. 4.
Figure 10:
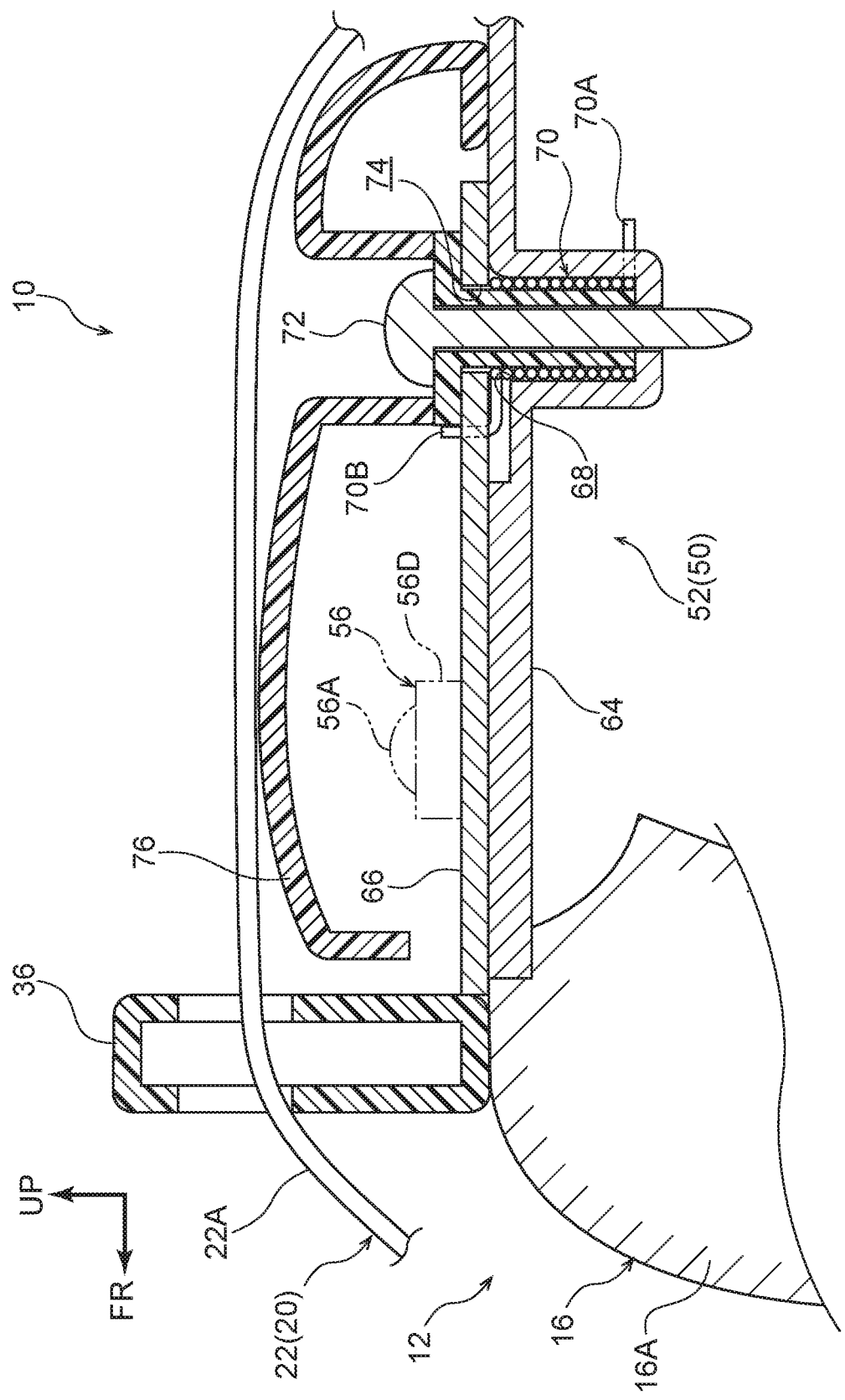
FIG. 10 is an enlarged cross-section illustrating a state sectioned along line 10-10 in FIG. 9.

As illustrated in FIG. 9 and FIG. 10, the upper movement section 52 includes a plate shaped base plate 64 fixed to the upper end portion of the seatback 16, and a bar shaped bracket 66 disposed on an upper face of the base plate 64 so as to be pivotably supported by the base plate 64. A non-illustrated bolt is inserted through a seat front-rear direction rear end portion of the base plate 64, and the base plate 64 is fastened and fixed to a non-illustrated upper section frame of the seatback 16 using nuts (not illustrated in the drawings). The base plate 64 is thereby fixed to the seatback 16. Note that illustration of the shoulder webbing 22A is omitted from FIG. 9 for ease of explanation.

An insertion opening 65 is provided in a seat front-rear direction rear portion of the base plate 64. An intermediate portion of the webbing 22, of which the one end is anchored to the retractor 26, is inserted through the insertion opening 65. A recess 68 (see FIG. 10) that is indented toward the seat lower side is provided at a seat front side of the insertion opening 65. The recess 68 is formed in a circular tube shape with its axial direction along the seat vertical direction. A torsion coil spring 70 is coaxially housed inside the recess 68. A lower end 70A of the torsion coil spring 70 is anchored to the recess 68.

The bracket 66 is formed in an elongated plate shape with its plate thickness direction along the seat vertical direction, and is disposed with its length direction substantially along the seat front-rear direction. A rear end portion of the bracket 66 is supported by the base plate 64 through a pin 72, and the shoulder anchor 36 is fixed to a front end portion of the bracket 66. Specifically, a circular hole 74 that penetrates the bracket 66 in the plate thickness direction is formed in the rear end portion of the bracket 66, and the circular hole 74 is disposed coaxially to the recess 68 in the base plate 64. The pin 72 is inserted into the circular hole 74 in a state in which a cover member 76 that covers the base plate 64 and the bracket 66 from the seat upper side is interposed between the pin 72 on one side and the base plate 64 and bracket 66 on the other side. The pin 72 passes through the cover member 76, the bracket 66, the torsion coil spring 70, and the recess 68, and supports the bracket 66 so as to allow pivoting relative to the base plate 64.

An upper end 70B of the torsion coil spring 70 is anchored to the bracket 66 in this state. The torsion coil spring 70 is anchored to the base plate 64 and the bracket 66 in a pre-wound (pre-stressed) state. A spring force (see the arrow C in FIG. 9) about one rotation direction with rotation centered on the pin 72 thereby acts on the bracket 66. The shoulder anchor 36 fixed to the bracket 66 is thereby biased toward the seat width direction inner side of the seatback 16 by the spring force of the torsion coil spring 70. Note that the torsion coil spring 70 corresponds to a "biasing member" of the present disclosure.

The terminal portion 56D at the seat upper side of the push-pull wire 56 is fixed to an intermediate portion of the bracket 66 by a non-illustrated fixing member. Thus, when the seatback 16 has been reclined to a predetermined angle (for example recline angle α=36°) or greater with respect to the vertical direction, the inner wire 56B of the push-pull wire 56 is pulled toward the vehicle lower side, and the bracket 66 is pulled toward the seat width direction outer side (see the arrow F in FIG. 9). The bracket 66 thereby moves toward the seat width direction outer side of the seatback 16 against the biasing force applied by the torsion coil spring 70. The shoulder anchor 36 is moved from the normal position D1 illustrated by solid lines in FIG. 9 to the moved position D2 illustrated by dotted dashed lines in FIG. 9 as a result.

When the seatback 16 is raised up from a state in which the recline angle α of the seatback 16 is set to 36° or greater with respect to the upright state, the tensile load in the direction toward the seat width direction outer side that acts on the bracket 66 through the inner wire 56B is lost. The bracket 66 is then moved toward the seat width direction inner side of the seatback 16 by the biasing force applied by the torsion coil spring 70. The shoulder anchor 36 then returns to its original position (the normal position D1).

Operation and Advantageous Effects

Explanation follows regarding operation and advantageous effects of the vehicle occupant restraint device 10 of the first exemplary embodiment.

As illustrated in FIG. 2 and FIG. 3, in the vehicle occupant restraint device 10, when the seatback 16 is in the upright state, the shoulder anchor 36 is disposed at the normal position D1, this being at the seat width direction inner side of a movement range of the mover device 50. In this state, the shoulder webbing 22A that extends from the shoulder anchor 36 extends from the seat width direction outer side and upper side of the seatback 16 toward the buckle device 32 at a lower portion at the seat width direction inner side of the seatback 16. The occupant P seated in the seat 12 is thereby placed in a state restrained by the webbing of the three point seatbelt device 20.

In the present exemplary embodiment, when the seatback 16 has been reclined by at least the predetermined angle (recline angle α=36°) or greater with respect to the vertical direction, the shoulder anchor 36 is moved to the moved position D2 at the seat width direction outer side of the seatback 16 by the mover device 50. Thus, when the seatback 16 has been heavily reclined with respect to the vertical direction, the shoulder webbing 22A can be moved in a direction away from the neck N of the occupant P, thereby suppressing contact between the shoulder webbing and the neck of the occupant. This enables the comfort of a reclining occupant to be improved when wearing the webbing.

To explain further regarding the above advantageous effect, as illustrated in FIG. 2, the position of the center of rotation (see the point Q1 in FIG. 2) of the upper body of the occupant P seated in the seat 12 and the position of the center of rotation (see the point Q2 in FIG. 2) of the seatback 16 are offset with respect to each other. Thus, when the seatback 16 is heavily reclined, the occupant P seated in the seat 12 moves relative to the seatback 16 from the position illustrated by solid lines to the position illustrated by double-dotted dashed lines in FIG. 3. In other words, the shoulder anchor 36 moves toward the upper side of the seatback relative to the occupant P. Thus, in cases in which the position of the shoulder anchor 36 is fixed, the shoulder webbing 22A that runs obliquely from the shoulder anchor 36 to a lower section of the seatback 16 might rub against the neck N of the occupant P and thereby cause discomfort.

However, in the vehicle occupant restraint device 10 according to the present exemplary embodiment, when the recline angle α of the seatback 16 is 36° or greater, the shoulder anchor 36 moves to the moved position D2 at the seat width direction outer side of the seatback 16. Namely, the shoulder webbing 22A can be moved in a direction away from the neck N of the occupant P, thereby suppressing contact between the shoulder webbing and the neck of the occupant.

Moreover, in the present exemplary embodiment, the mover device 50 includes the push-pull wire 56 that couples together the shoulder anchor 36 and the portion of the seat cushion 14, such that the shoulder anchor 36 is moved to the moved position D2 at the seat width direction outer side of the seatback 16 by tensile load applied from the push-pull wire 56 coordinated with the reclining of the seatback 16. This enables the comfort of the occupant to be improved using a simple configuration.

Furthermore, the mover device 50 includes the torsion coil spring 70 that biases the shoulder anchor 36 toward the seat width direction inner side of the seatback 16 by spring force. Thus, the shoulder anchor 36 is moved to the normal position D1 at the seat width direction inner side of the seatback 16 by the spring force of the torsion coil spring 70 when the seatback 16 is returned from a position heavily reclined with respect to the vertical direction to a position in the upright state. This enables an appropriate distance to be maintained between the shoulder webbing 22A and the neck N of the occupant P according to the recline angle of the seatback 16 with respect to the vertical direction, enabling greater convenience and comfort for the occupant P.

Second Exemplary Embodiment

Figure 11:
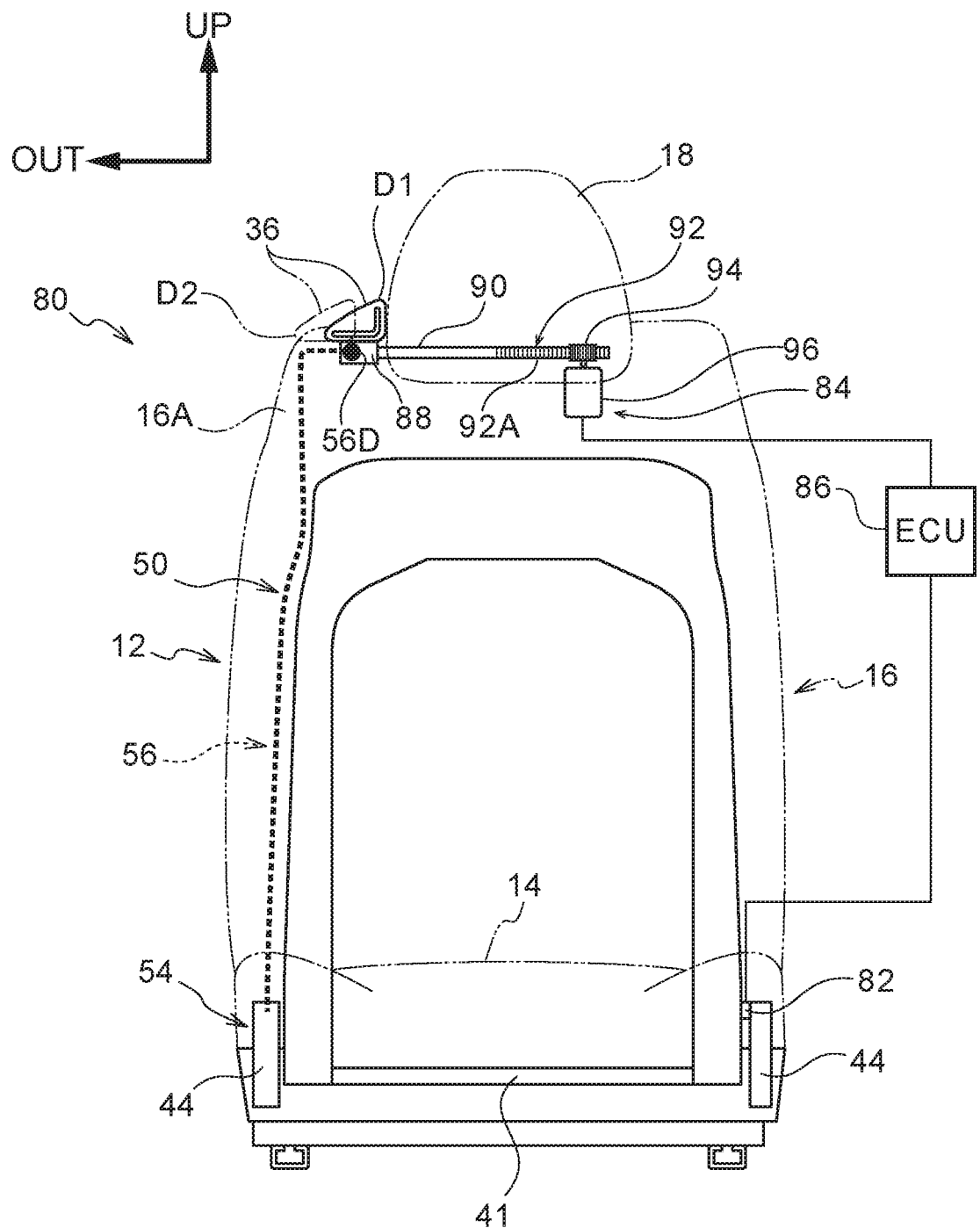
FIG. 11 is a schematic face-on view corresponding to FIG. 5, illustrating a vehicle occupant restraint device according to a second exemplary embodiment.
Figure 12:
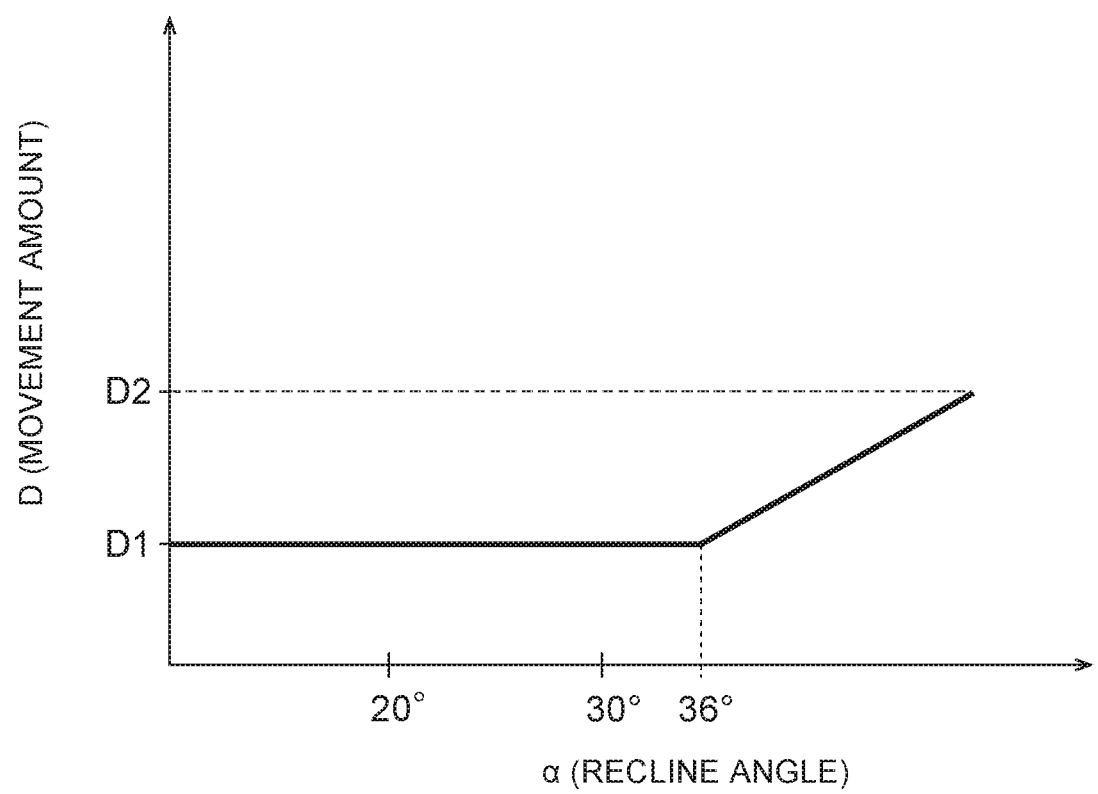
FIG. 12 is a graph illustrating a relationship between a recline angle of a seatback and a seat width direction movement amount of a shoulder webbing anchor with respect to the seatback in the vehicle seat illustrated in FIG. 11.

Explanation follows regarding a vehicle occupant restraint device 80 according to a second exemplary embodiment, with reference to FIG. 11 and FIG. 12. Note that configuration portions that are the same as those in the first exemplary embodiment described above are appended with the same reference numerals, and explanation thereof is omitted.

As illustrated in FIG. 11, the vehicle occupant restraint device 80 includes a sensor 82 that detects the recline angle α of the seatback 16 with respect to the vertical direction, a mover device 84 that moves the shoulder anchor 36 substantially in the seat width direction of the seatback 16, and an Electronic Control Unit (ECU) 86 that controls actuation of the mover device 84 based on the recline angle α detected by the sensor 82. Note that the mover device 84 is an example of an electrical adjustment device.

The sensor 82 is provided on the corresponding guide section 44 at a position facing the rotation section 42. The ECU 86 is configured by a microcomputer including a Central Processing Unit (CPU), Read Only Memory (ROM), Random Access Memory (RAM), and the like. The ECU 86 is for example disposed in the interior of an instrument panel (not illustrated in the drawings) disposed at the front side of the vehicle cabin interior. The ECU 86 is electrically connected to the sensor 82, and a detection signal indicating an angle detected by the sensor 82 is input to the ECU 86.

The mover device 84 includes a support section 88 that supports the shoulder anchor 36, and a guide section 90 that guides and moves the support section 88 in the seat width direction. The mover device 84 also includes a shaft 92 that is attached to the support section 88 and includes a rack 92A, a pinion 94 that meshes with the rack 92A, and a motor 96 that rotates the pinion 94. The ECU 86 is electrically connected to the motor 96, and uses the motor 96 to rotate the pinion 94. The shaft 92 including the rack 92A is moved in substantially the seat width direction of the seatback 16, such that the shoulder anchor 36 is moved in substantially the seat width direction of the seatback 16.

In the graph in FIG. 12, the horizontal axis represents the recline angle α of the seatback 16, and the vertical axis represents a seat width direction movement amount D of the shoulder anchor 36 with respect to the seatback 16 in the seat 12. As illustrated in FIG. 12, the ECU 86 actuates the mover device 84 when a recline angle α of the seatback 16 of 36° or greater has been detected by the sensor 82. The shoulder anchor 36 is gradually moved toward the seat width direction outer side from the normal position D1 illustrated by solid lines in FIG. 11 to the moved position D2 illustrated by double-dotted dashed lines in FIG. 11, coordinated with the recline angle α of the seatback 16. In other words, after actuation, the mover device 84 increases the movement amount of the shoulder anchor 36 toward the seat width direction outer side accompanying an increase in the recline angle α of the seatback 16.

Operation and Advantageous Effects

The vehicle occupant restraint device 80 obtains the following advantageous effects in addition to the advantageous effect described in the first exemplary embodiment. In the vehicle occupant restraint device 80, the shoulder anchor 36 is moved toward the seat width direction outer side by the electrical mover device 84 coordinated with reclining of the seatback 16. In the present exemplary embodiment, using the electrical mover device 84 enables the movement amount of the shoulder anchor 36 to be set as desired with respect to the recline angle α of the seatback 16, in contrast for example to cases in which a mechanical configuration is used to move a shoulder belt anchor (shoulder anchor) coordinated with reclining of a seatback. Namely, this further improves the comfort of the occupant P.

Moreover, in the present exemplary embodiment, the movement amount of the shoulder anchor 36 toward the seat width direction outer side is increased by the mover device 84 accompanying an increase in the recline angle α of the seatback 16. The position of the shoulder anchor 36 is thereby adjusted appropriately according to the recline angle α of the seatback 16, thereby enabling the comfort of the occupant P to be further improved.

Third Exemplary Embodiment

Explanation follows regarding a vehicle occupant restraint device 110 according to a third exemplary embodiment, with reference to FIG. 13 to FIG. 16. Note that configuration portions that are the same as those in the first exemplary embodiment and second exemplary embodiment described above are appended with the same reference numerals, and explanation thereof is omitted.

Figure 13:
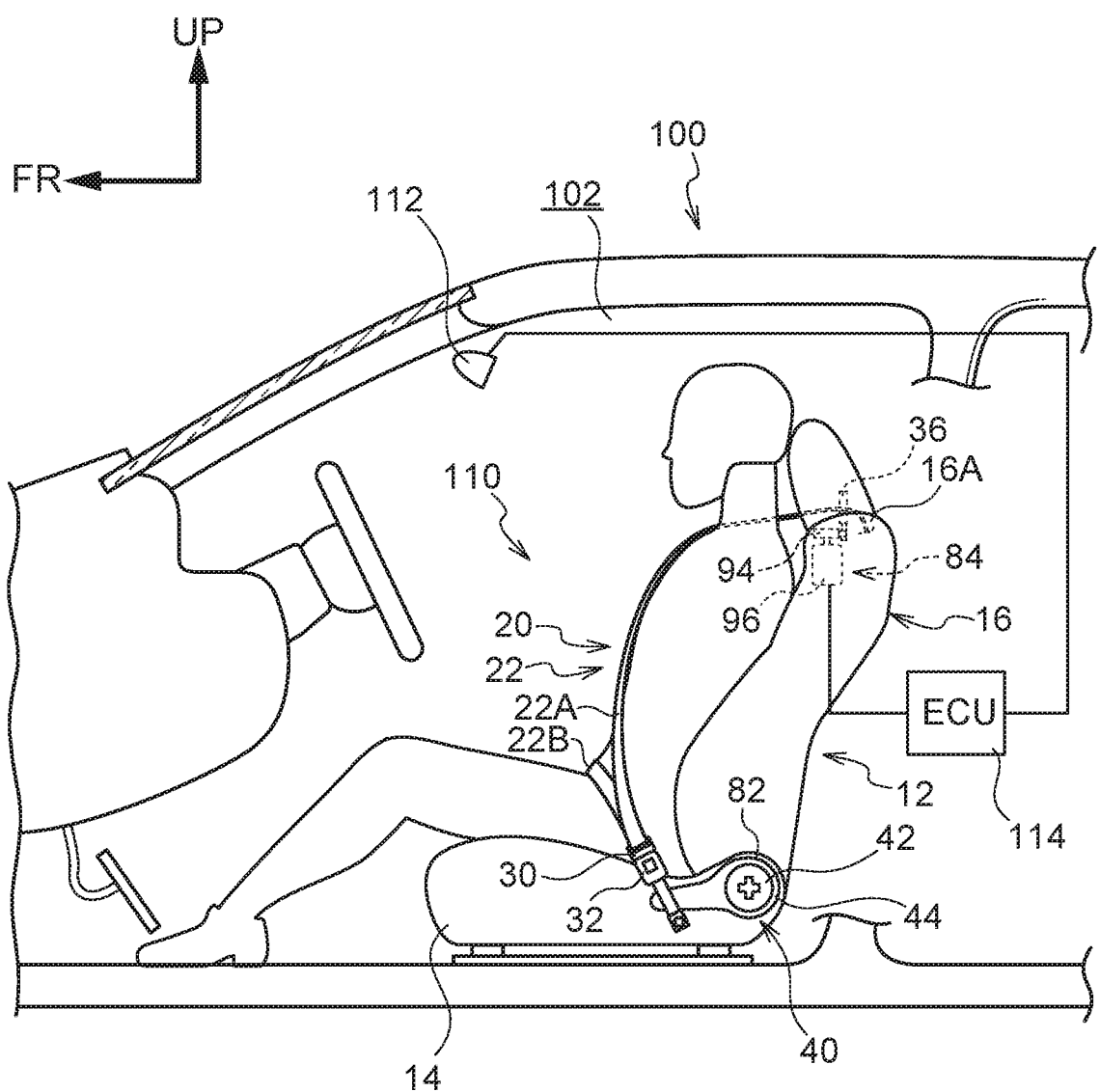
FIG. 13 is a side view of a vehicle cabin interior of a vehicle applied with a vehicle occupant restraint device according to a third exemplary embodiment, in a state in which an occupant seated in a vehicle seat is restrained while a seatback is upright.

FIG. 13 is a side view of the interior of a vehicle cabin 102 of a vehicle 100 applied with the vehicle occupant restraint device 110, illustrating a state in which an occupant (not allocated a reference numeral) seated in the seat 12 is being restrained by webbing while the seatback 16 is in the upright state. As illustrated in FIG. 13, in the present exemplary embodiment, the vehicle occupant restraint device 110 includes a camera 112 that is disposed at the vehicle front-rear direction front side of the interior of the vehicle cabin 102 of the vehicle 100 and images the occupant seated in the seat 12. The vehicle occupant restraint device 110 also includes the mover device 84 that moves the shoulder anchor 36 in substantially the seat width direction of the seatback 16, and the sensor 82 that detects the recline angle α of the seatback 16 with respect to the vertical direction.

The vehicle occupant restraint device 110 further includes an ECU 114 that controls actuation of the mover device 84 based on a shoulder height position of the occupant detected using image data captured by the camera 112 and the recline angle α detected by the sensor 82. Note that the camera 112 is an example of a detection sensor.

The ECU 114 is configured by a microcomputer including a Central Processing Unit (CPU), Read Only Memory (ROM), Random Access Memory (RAM), and the like. The camera 112 and the sensor 82 are electrically connected to the ECU 114. A signal representing occupant image data captured by the camera 112 and a signal corresponding to the recline angle α detected by the sensor 82 are input to the ECU 114. A shoulder height position on the seatback 16 of an occupant with a comparatively small physical build (such as an occupant with a physical build equivalent to an AF05 dummy) is pre-stored in the ECU 114. Note that an AF05 dummy is a dummy corresponding to an American adult female of small physical build.

Figure 14:
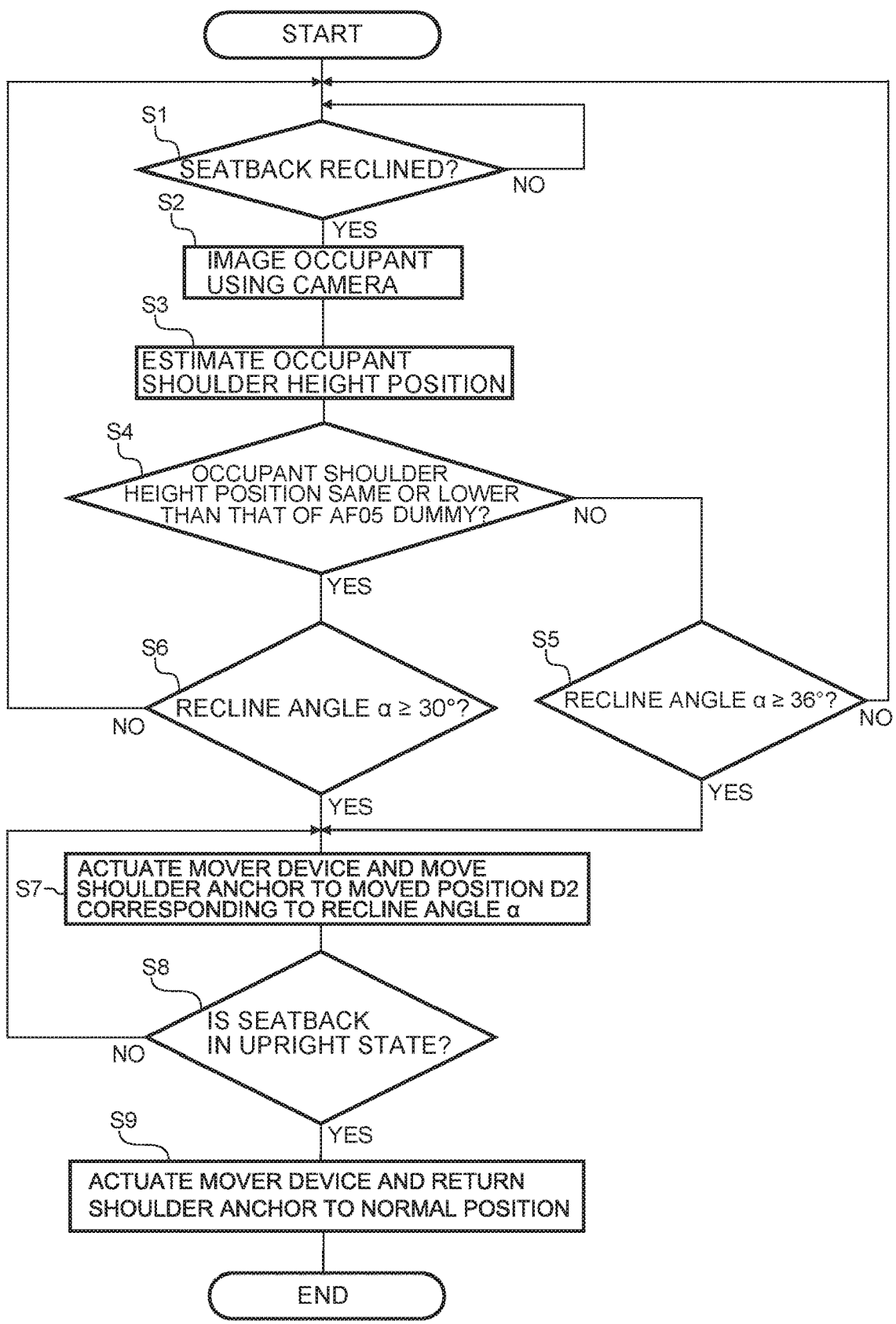
FIG. 14 is a flowchart illustrating a flow of control of a mover device applied to the vehicle occupant restraint device illustrated in FIG. 13.
Figure 15:
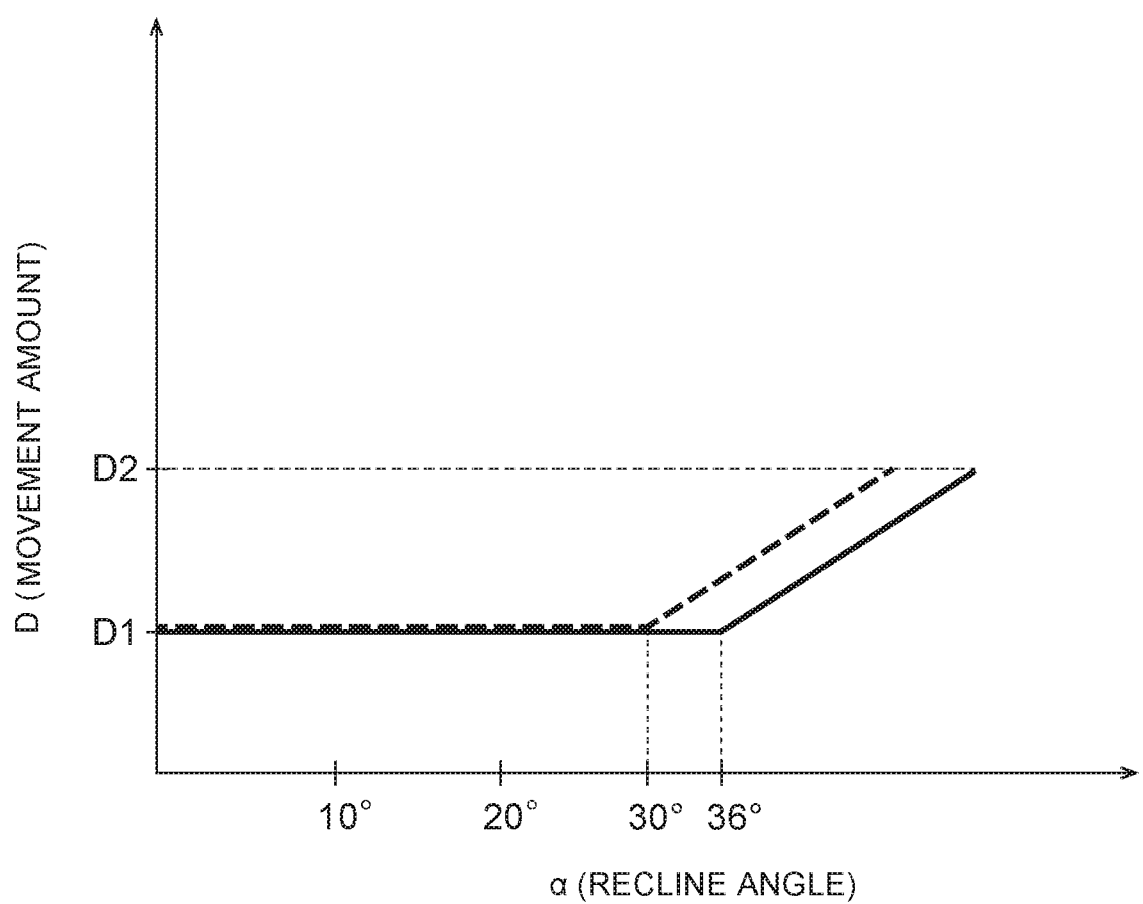
FIG. 15 is a graph illustrating a relationship between a recline angle of a seatback and a seat width direction movement amount of a shoulder webbing anchor with respect to the seatback in the vehicle seat illustrated in FIG. 13.

FIG. 14 is a flowchart illustrating a flow of control of the mover device 84 by the ECU 114. In the graph in FIG. 15, the horizontal axis represents the recline angle α of the seatback 16, and the vertical axis represents a seat width direction movement amount D of the shoulder anchor 36 with respect to the seatback 16 in the seat 12. In FIG. 15, a case in which an AM50 dummy is seated in the seat 12 is illustrated by a solid line, and a case in which an AF05 dummy is seated in the seat 12 is illustrated by a dashed line.

As illustrated in FIG. 14, when the ECU 114 detects that the seatback 16 has been reclined by an occupant seated in the seat 12 (step S1), the ECU 114 starts imaging of the occupant seated in the seat 12 by the camera 112 (step S2).

The ECU 114 performs computation to estimate the shoulder height position on the seatback 16 of the occupant seated in the seat 12, based on the image data captured by the camera 112 (step S3). As an example, the ECU 114 recognizes the position of the head of the occupant in the image data captured by the camera 112, and performs computation to estimate the shoulder height position on the seatback 16 of the occupant based on the position of the head.

Based on the shoulder height position of the occupant estimated at step S3, the ECU 114 determines whether or not the shoulder height position of the occupant seated in the seat 12 is approximately the same as or lower than the shoulder height position of an AF05 dummy (step S4).

In cases in which negative determination is made at step S4, namely, in cases in which the shoulder height position of the occupant seated in the seat 12 is higher than the shoulder height position of the AF05 dummy, the ECU 114 transitions to step S5. At step S5, determination is made as to whether or not the recline angle α of the seatback 16 detected by the sensor 82 is 36° or greater.

In cases in which affirmative determination is made at step S5, namely, in cases in which the recline angle α of the seatback 16 is 36° or greater, processing transitions to step S7 and the mover device 84 is actuated. Specifically, the ECU 114 actuates the mover device 84 as illustrated by the solid line in FIG. 15, and gradually moves the shoulder anchor 36 toward the seat width direction outer side from the normal position D1 to the moved position D2 corresponding to the recline angle α (≥36°), coordinated with the recline angle α of the seatback 16. In cases in which negative determination is made at step S5, namely, in cases in which the recline angle α of the seatback 16 is smaller than 36°, the ECU 114 repeats the processing from step S1.

If the ECU 114 then detects that the recline angle α of the seatback 16 has changed, processing transitions to step S8. In cases in which affirmative determination is made at step S8, namely, when the ECU 114 confirms that the seatback 16 has returned to the upright state (a state in which α<36°), the ECU 114 moves the shoulder anchor 36 to the normal position D1 (step S9), and control by the ECU 114 ends. In cases in which negative determination is made at step S8, namely, when the ECU 114 confirms that the recline angle α of the seatback 16 has changed in a state in which the recline angle satisfies the condition of α≥36°, the processing from step S7 is repeated.

In cases in which affirmative determination is made at step S4, namely, in cases in which the shoulder height position of the occupant seated in the seat 12 is equivalent to or lower than the shoulder height position of the AF05 dummy, the ECU 114 transitions to step S6. At step S6, determination is made as to whether or not the recline angle α of the seatback 16 detected by the sensor 82 is 30° or greater. In cases in which affirmative determination is made at step S6, namely, in cases in which the recline angle α of the seatback 16 is 30° or greater, processing transitions to step S7 and the mover device 84 is actuated. Specifically, as illustrated by the dashed line in FIG. 15, the ECU 114 actuates the mover device 84, and gradually moves the shoulder anchor 36 toward the seat width direction outer side from the normal position D1 to the moved position D2 corresponding to the recline angle α (≥30°), coordinated with the recline angle α of the seatback 16. In cases in which negative determination is made at step S6, namely, in cases in which the recline angle α of the seatback 16 is smaller than 30°, the ECU 114 repeats the processing from step S1.

If the ECU 114 then detects that the recline angle α of the seatback 16 has changed, processing transitions to step S8. In cases in which affirmative determination is made at step S8, namely, when the ECU 114 confirms that the seatback 16 has returned to the upright state (a state in which α<30°), the ECU 114 moves the shoulder anchor 36 to the normal position D1 (step S9), and control by the ECU 114 ends. In cases in which negative determination is made at step S8, namely, when the ECU 114 confirms that the recline angle α of the seatback 16 has changed in a state in which the recline angle satisfies the condition of α≥30°, the processing from step S7 is repeated.

Namely, in the mover device 84 with the above configuration, a recline angle α of the seatback 16 that configures a threshold value for actuation of the mover device 84 is changed according to the shoulder height position of the occupant as estimated by the computation using image data from the camera 112 (see FIG. 15). Specifically, in cases in which the shoulder height position of the occupant seated in the seat 12 is equivalent to or lower than that of an AF05 dummy, the recline angle α of the seatback 16 configuring the threshold value for actuation of the mover device 84 is set smaller than in cases in which an occupant with a shoulder height position higher than that of an AF05 dummy is seated in the seat 12.

Operation and Advantageous Effects

The vehicle occupant restraint device 110 obtains the following advantageous effects in addition to the advantageous effects described in the first exemplary embodiment and second exemplary embodiment. In the vehicle occupant restraint device 110, the shoulder height position on the seatback 16 of the occupant seated in the vehicle seat 12 is estimated from a detection value based on image data captured by the camera 112. The recline angle α of the seatback 16 at which the mover device 84 is to be actuated is changed according to the shoulder height position of the occupant.

Specifically, in cases in which the shoulder height position of the occupant seated in the seat 12 is estimated to be equivalent to or lower than that of an AF05 dummy, the recline angle α threshold value for actuation of the mover device 84 is set to α=30°. However, in cases in which the shoulder height position is estimated to be higher than that of an AF05 dummy, the recline angle α threshold value for actuation of the mover device 84 is set to α=36°. Namely, in the present exemplary embodiment, the shoulder height position on the seatback 16 corresponding to an AF05 dummy that has been pre-stored in the ECU 114 is used as a reference when calculating the size of the physical build of the seated occupant. In cases in which the seated occupant is determined to have a small physical build, the recline angle α threshold value is set smaller than in cases in which the seated occupant is determined to have a large physical build.

In cases in which an occupant of small physical build (such as an occupant with a physical build equivalent to or smaller than that of an AF05 dummy) is seated in the seat 12, the distance between the shoulder webbing 22A and the neck of the occupant becomes smaller, even in cases in which the recline angle α of the seatback 16 is small, resulting in a possibility of interference.

Thus, in cases in which the seated occupant has a small physical build, setting the recline angle α threshold value to a smaller value than in cases in which the seated occupant has a large physical build enables interference between the shoulder webbing 22A and the neck of the occupant to be effectively suppressed, even in cases in which the occupant is seated with the seatback in a reclined state.

In this manner, in the vehicle occupant restraint device 110 with the above configuration, the position of the shoulder anchor 36 is adjusted according to the recline angle α of the seatback 16 so as to suit the size of the physical build of the occupant P seated in the seat 12, thereby enabling contact between the shoulder webbing 22A and the neck of the occupant to be effectively suppressed. The comfort of a reclining occupant when wearing the webbing is thus further improved.

Supplementary Explanation

Note that configuration of the mover device 50, 84 that moves that shoulder anchor 36 in substantially the seat width direction of the seatback 16 in the first exemplary embodiment to the third exemplary embodiment may be modified. For example, the mover device 84 may move the shoulder anchor 36 toward substantially the seat width direction outer side of the seatback 16 using an actuator, a drive section such as a hydraulic cylinder, a link mechanism, or the like.

Moreover, although the present disclosure is applied to the vehicle occupant restraint device 10, 80, 110 of the seat 12 on the driving seat side of the vehicle in the first exemplary embodiment to the third exemplary embodiment, the present disclosure is not limited to this configuration. For example, the vehicle occupant restraint device of the present disclosure may be applied to a vehicle seat other than the driving seat, such as a front passenger seat.

Moreover, in the second exemplary embodiment and the third exemplary embodiment, the mover device 84 is controlled such that the shoulder anchor 36 is gradually moved toward the seat width direction outer side from the normal position D1 to the moved position D2 coordinated with the recline angle α of the seatback 16. However, the present disclosure is not limited to a configuration in which the movement amount toward the seat width direction outer side by the mover device 84 is increased accompanying an increase in the recline angle α of the seatback 16. For example, the mover device 84 may be controlled such that the shoulder anchor 36 is moved from the normal position D1 to the moved position D2 if the recline angle α of the seatback 16 has been detected as being 36° or greater by the sensor 82. Alternatively, the mover device 84 may be controlled such that the shoulder anchor 36 is moved in discrete steps coordinated with the recline angle α of the seatback 16.

Moreover, in the first exemplary embodiment, the shoulder anchor 36 pivots toward the seat width direction outer side of the seatback 16 about the pin 72 due to the tensile load applied to the bracket 66 supporting the shoulder anchor 36 by the push-pull wire 56. However, the present disclosure is not limited thereto. For example, a rail extending along the seat width direction may be fixed in the interior of the upper section 16A of the seatback 16, and the shoulder anchor 36 supported through a coupling member that is slidably supported by the rail. In such cases, the terminal portion 56D at the seat upper side of the push-pull wire 56 is fixed to the coupling member, and the coupling member is moved toward the seat width direction outer side according to reclining of the seatback 16.

Moreover, in the first exemplary embodiment, the torsion coil spring 70 is applied as a biasing member to bias the shoulder anchor 36 toward the seat width direction inner side of the seatback 16 by spring force. However, the present disclosure is not limited thereto. A tension coil spring may be applied as a biasing member according to the present disclosure. Namely, the tension coil spring may be disposed with its axial direction along the seat width direction, and its two end portions coupled to the shoulder anchor 36 and to the seatback 16. The shoulder anchor 36 may thereby be biased toward the seat width direction inner side of the seatback 16 by spring force.

Moreover, in the third exemplary embodiment, in cases in which the seatback 16 is in the upright state, the shoulder anchor 36 is disposed in the normal position D1 regardless of the shoulder height position of the occupant seated in the seat 12. However, the present disclosure is not limited thereto, and a modified example of the third exemplary embodiment as illustrated in FIG. 16 may be applied.

Figure 16:
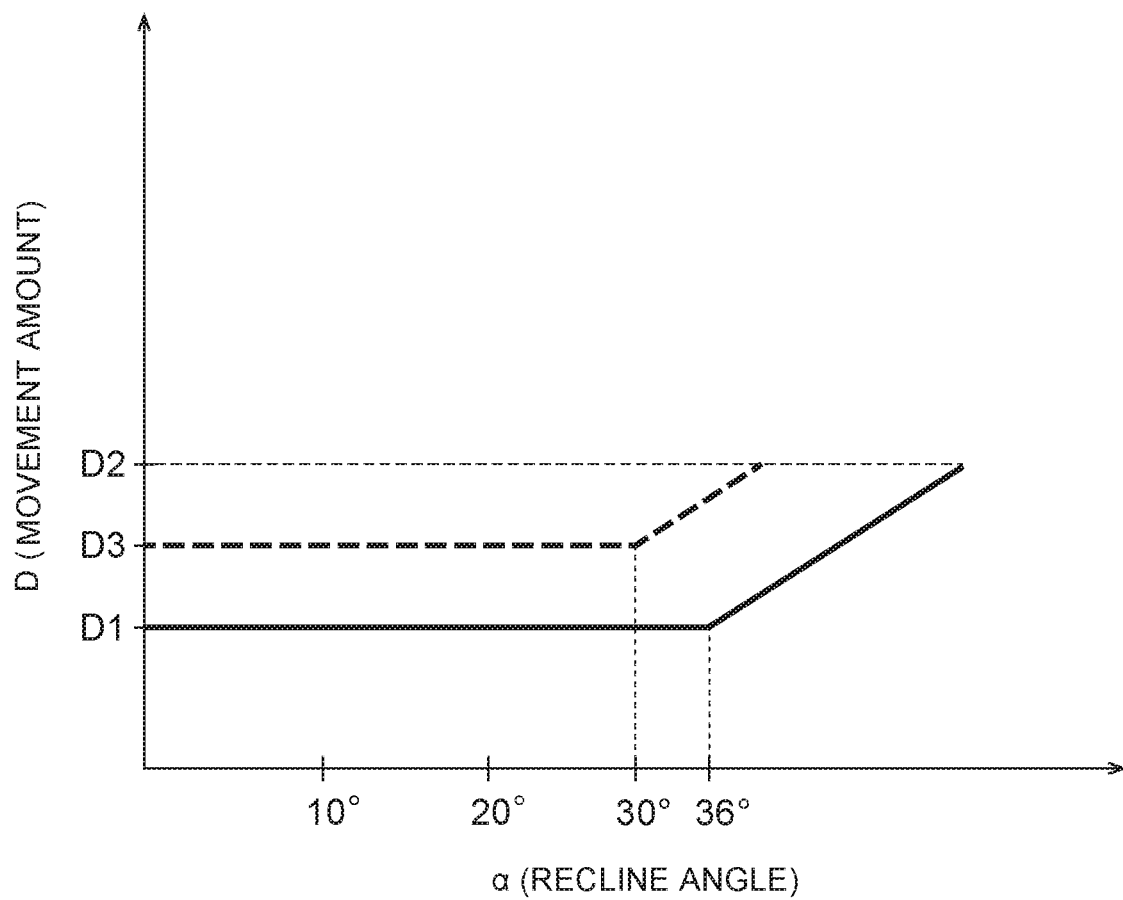
FIG. 16 is a graph corresponding to FIG. 12 to explain a modified example of the vehicle occupant restraint device according to the third exemplary embodiment.

In the modified example of the third exemplary embodiment illustrated in FIG. 16, in cases in which an occupant of small physical build is seated in the seat 12 (such as an occupant with a physical build equivalent to or smaller than that of an AF05 dummy), the shoulder anchor 36 is moved to an intermediate position D3 in a state in which a recline angle α of a seatback is set smaller than 30°. The intermediate position D3 is positioned further toward the seat width direction outer side than the normal position D1 and positioned further toward the seat width direction inner side than the moved position D2. In a state in which the recline angle α of the seatback has been set to 30° or greater, control is performed to move the shoulder anchor 36 gradually toward the seat width direction outer side from the intermediate position D3 to the moved position D2 coordinated with the recline angle α.

The above configuration enables the shoulder webbing 22A to be kept apart from the neck of an occupant of small physical build, relative to whom the shoulder anchor 36 is positioned further toward the seat upper side than in cases in which an occupant of large physical build is seated in the seat 12, even if the seatback 16 has been set to the upright state. Thus, in cases in which an occupant of small physical build is seated in the seat 12, interference between the shoulder webbing 22A and the neck of the occupant is suppressed both in a state in which the seatback 16 has been heavily reclined, and in the upright state. This enables the comfort of an occupant when wearing the webbing to be effectively improved.

Moreover, in the third exemplary embodiment, the recline angle α threshold value of the seatback 16 for actuation of the mover device 84 is set to different values (α=30°, or α=36°) depending on whether or not the shoulder height position of the occupant seated in the seat 12 is equivalent to or smaller than that of an AF05 dummy. However, the present disclosure is not limited thereto. For example, plural threshold values may be set for shoulder height positions on the seatback 16, and the seatback 16 recline angle α threshold values for actuation of the mover device 84 may be set corresponding to ranges between the respective threshold values.

Moreover, although the camera 112 is applied as the detection sensor to estimate the height position on the seatback 16 of the shoulders S of the occupant P seated in the seat 12 in the third exemplary embodiment, the present disclosure is not limited thereto. For example, a known electrostatic capacity sensor may be applied as the detection sensor. In such cases, the electrostatic capacity sensor is installed in the interior of the seatback, the size of the physical build of an occupant seated in the seat 12 is determined based on the electrostatic capacity between sensor electrodes that changes according to the physical build of the occupant, and this is used to estimate the shoulder height position of the occupant.

Alternatively, for example, a known load detection sensor may be applied as the detection sensor. In such cases, the sensor is disposed in the interior of the seatback or the seat cushion, the size of the physical build of an occupant is determined based on the size of the load detected by the sensor, and this is used to estimate the shoulder height position of the occupant.

Alternatively, for example, a known seat position sensor that outputs a signal according to a vehicle front-rear position of the seat cushion with respect to the vehicle body floor may be applied as the detection sensor. In such cases, the size of the physical build of an occupant seated in the vehicle seat is determined based on the vehicle front-rear direction seat position of the vehicle seat detected by the seat position sensor, and this is used to estimate the shoulder height position of the occupant.

Alternatively, for example, a sensor that is installed to the retractor configuring the three point seatbelt device and that outputs a signal according to the amount of webbing that has been pulled out may be applied as the detection sensor. In such cases, the size of the physical build of an occupant seated in the vehicle seat is determined based on the amount of webbing that has been pulled out as detected by the sensor, and this is used to estimate the shoulder height position of the occupant.

What is claimed is:

1. A vehicle occupant restraint device, comprising:
   a three point seatbelt device that includes shoulder webbing running from one end side, in a seat width direction, of an upper section of a seatback toward a buckle at another end side, in the seat width direction, of a lower section of the seatback;
   a shoulder webbing anchor that is provided at the one end side of the upper section of the seatback and through which the shoulder webbing is inserted; and a mover device that moves the shoulder webbing anchor toward a seat width direction outer side of the seatback when the seatback, which is configured to recline from an upright state, is reclined by at least a predetermined angle or greater with respect to a vertical direction, wherein the mover device includes (i) a push-pull wire, which couples together the shoulder webbing anchor and a portion of a seat cushion, and (ii) a biasing member that uses spring force to bias the shoulder webbing anchor toward a seat width direction inner side of the seatback; and wherein the push-pull wire of the mover device comprises: an outer tube extending vertically and being located inside the seatback; and an inner wire connecting the shoulder webbing anchor and a part of the seat cushion while being inserted into the outer tube, the inner wire being further configured to be movable in the outer tube according to an inclination angle of the seatback with respect to the vertical direction.

2. The vehicle occupant restraint device according to claim 1, wherein:

the mover device further comprises (i) a guide section provided at a side portion of the seat cushion and (ii) a guide plate provided at a lower end portion of the seatback and disposed at an upper side of the guide section;

a terminal portion of the inner wire is connected to the seat cushion;

the inner wire is inserted between the guide section and the guide plate on an upper side of the terminal portion; and the guide plate moves relative to the guide portion according to the inclination angle of the seatback to guide the movement of the inner wire.

3. A vehicle occupant restraint device, comprising:

a three point seatbelt device that includes shoulder webbing running from one end side, in a seat width direction, of an upper section of a seatback toward a buckle at another end side, in the seat width direction, of a lower section of the seatback;

a shoulder webbing anchor that is provided at the one end side of the upper section of the seatback and through which the shoulder webbing is inserted; and a mover device that moves the shoulder webbing anchor toward a seat width direction outer side of the seatback when the seatback, which is configured to recline from an upright state, is reclined by at least a predetermined angle or greater with respect to a vertical direction, wherein:

the mover device includes an electrical adjustment device that moves the shoulder webbing anchor in conjunction with reclining of the seatback;

a movement amount of the shoulder webbing anchor toward the seat width direction outer side increases in conjunction with an increase in an angle at which the seatback is reclined with respect to the vertical direction;

the electrical adjustment device includes a detection sensor configured to detect a physical amount for use in estimating, based on a detection value detected by the detection sensor, a shoulder height position, of an occupant seated in a vehicle seat, with respect to the seatback; and the predetermined angle of the seatback with respect to the vertical direction at which the electrical adjustment device is to be actuated is changed in accordance with the estimated shoulder height position.

4. The vehicle occupant restraint device of claim 3, wherein the electrical adjustment device determines a size of a physique of the occupant based on the estimated shoulder height position, and a threshold value of the predetermined angle of the seatback with respect to the vertical direction, at which the electrical adjustment device is to be actuated, is configured to be directly proportional to the determined size of the occupant's physique.

* * * * *